United States Patent
Mecerreyes Molero et al.

(10) Patent No.: US 12,104,015 B2
(45) Date of Patent: Oct. 1, 2024

(54) METHOD FOR THE SYNTHESIS OF POLYETHERS

(71) Applicants: UNIVERSIDAD DEL PAIS VASCO/EUSKAL HERRIKO UNIBERTSITATEA, Leioa (ES); BASQUE CENTER FOR MACROMOLECULAR DESIGN AND ENGINEERING, POLYMAT FUNDAZIOA, San Sebastian (ES)

(72) Inventors: David Mecerreyes Molero, Lasarte-Oria (ES); Andere Basterretxea Gorostiza, San Sebastian (ES); Elena Gabirondo Amenabar, San Sebastian (ES); Haritz Sardon Muguruza, San Sebastian (ES)

(73) Assignees: UNIVERSIDAD DEL PAIS VASCO, Leioa (ES); BASQUE CENTER FOR MACROMOLECULAR DESIGN AND ENGINEERING, POLYMAT FUNDAZIOA, San Sebastian (ES)

( * ) Notice: Subject to any disclaimer, the term of this patent is extended or adjusted under 35 U.S.C. 154(b) by 974 days.

(21) Appl. No.: 17/053,562

(22) PCT Filed: May 10, 2019

(86) PCT No.: PCT/ES2019/070311
§ 371 (c)(1),
(2) Date: Nov. 6, 2020

(87) PCT Pub. No.: WO2019/215373
PCT Pub. Date: Nov. 14, 2019

(65) Prior Publication Data
US 2021/0238346 A1 Aug. 5, 2021

(30) Foreign Application Priority Data

May 11, 2018 (ES) .................................. 201830462

(51) Int. Cl.
*C08G 65/34* (2006.01)
*B01J 31/02* (2006.01)

(52) U.S. Cl.
CPC .......... *C08G 65/34* (2013.01); *B01J 31/0225* (2013.01); *B01J 31/0251* (2013.01); *B01J 31/0298* (2013.01)

(58) Field of Classification Search
CPC ... C08G 65/34; B01J 31/0225; B01J 31/0251; B01J 31/0298
See application file for complete search history.

(56) References Cited

PUBLICATIONS

S. Zhang, et al; Poly(oxyalkylene) synthesis in bronsted acid ionic liquids; Chemical Communications; vol. 47; No. 39; Jan. 1, 2011; pp. 11092-11094.

P.K. Dannecker, et al; Renewable polyethers via GaBr 3-Catalyzed reduction of polyesters; Angewandte Chemie, vol. 57; No. 28, May 3, 2018; pp. 8775-8779.

(Continued)

*Primary Examiner* — John E Uselding
(74) *Attorney, Agent, or Firm* — LUCAS & MERCANTI, LLP

(57) ABSTRACT

A method for the preparation of polyethers is provided, the method using a protic ionic salt formed by the combination of a Bronsted acid and a Bronsted base, as well as to the polyethers obtained using the method.

19 Claims, 24 Drawing Sheets

(56) References Cited

PUBLICATIONS

T. Shaffer, et al; Functional polymers and sequential copolymers by phase-transfer catalysis . . . ; Journal of Polymer Science Part A: Polymer Chemistry; Jan. 1, 1986; pp. 15-27.

V.H. Alvarez, et al; Synthesis and thermophysical properties of two new protic long-chain ionic liquids with the oleate anion; Fluid Phase Equilibria 299; 2010, pp. 42-50.

O. Coulembier, et al; An imidazole-based organocatalyst designed for bulk polymerization of lactide isomers: inspiration from nature; Chem. Commun.; 2012; vol. 48; pp. 11695-11697.

D.J. Coady, et al; Catalytic insights into acid/base conjugates: highly selective bifunctional catalysts for the ring-opening polymerization of lactide; Chem. Commun.; 2011; vol. 47; pp. 3105-3107.

S. Garcia-Arguelles, et al; Near to eutectic mixtures as bifunctional catalysts in the low temperature ring opening polymerization of . . . ; Green Chemistry; 2015; vol. 17; pp. 3632-3643.

M.J. Rhoad, et al; The synthesis of poymeric ethers; Journal Am. Chem. Soc.; 1950; vol. 72; pp. 2216-2219.

T. Biedron, et al; Cationic polymerization of 3-ethyl-3-hydroxymethyloxetane in an ionic liquid; Macromolecular Rapid Communications; 2004; vol. 25; pp. 878-881.

R. Klein, et al; Aliphatic polyethers: classical polymers for the 21st century; Macromolecular Rapid Communications; 2015; vol. 36; pp. 1147-1165.

M. Jayakannan, et al; Preparation of polyethers via proton acid catalyzed transetherification reactions; Macromolecular Chemistry and Physics; 2000; vol. 201; pp. 759-767.

T. Isono, et al; Design and synthesis of thermoresponsive aliphatic polyethers with a tunable phase transition temperature; Polymer Chemistry; 2017; vol. 8; pp. 5698-5707.

International Search Report for Corresponding International Application No. PCT/ES2019/070311 dated Mar. 23, 2020 with English translation; 5 Pages.

METHOD FOR THE SYNTHESIS OF POLYETHERS

CROSS REFERENCE TO RELATED APPLICATION

This Application is a 371 of PCT/ES2019/070311 filed on May 10, 2019 which, in turn, claimed the priority of Spanish Patent Application No. P201830462 filed on May 11, 2018, both applications are incorporated herein by reference.

FIELD OF THE INVENTION

The present invention relates to the field of polyether synthesis by means of direct diol polymerization. In particular, the present invention relates to polyethers and to a process for synthesizing polyethers (under mild conditions) using a protic ionic salt as catalyst.

BACKGROUND OF THE INVENTION

Polyethers are materials of commercial interest due to their thermal and chemical stability and also due to the possibility of multiple functionalization. Depending on the microstructure of the polymer, these materials range from being liquid and amorphous to being crystalline. Therefore, polyethers have extensive applications and can be used as water-soluble surfactants or drug delivery vehicles; however, they can also be used in highly engineered applications such as solid polymer electrolytes in energy storage applications (batteries).

The most widely used among potential aliphatic polyethers are polyepoxides, polyoxetanes, and polytetrahydrofurans, mainly because they can be prepared by means of ring-opening polymerization of the corresponding cyclic ethers, such as oxiranes, oxetanes, and tetrahydrofuran. However, this method does not allow obtaining larger polyethers (containing 6 or more methylene units) because the cyclic ethers used as precursors are extremely stable. In these cases, polyethers with a larger number of methylenes could be produced using the Williamson synthesis. In the Williamson synthesis, the ether bond is generated by means of an $S_N2$ mechanism, whereby an ether is formed from a primary haloalkane and an alkoxide (or an alcohol in a basic medium). Although this method is highly efficient, polymerization generates by-products, such as choline, which limits its industrial implementation.

Another way to produce polyethers consists of acid-catalyzed condensation between two alcohols. In the 1950s, Rhoad and Flory were the pioneers in carrying out self-condensation of 1,10-decanediol in the presence of sulfamic or sulfuric acids at a high temperature (300° C.) (*M. J. Rhoad and P. J. Flory, J. Am. Chem. Soc., 1950, 72, 2216-2219*). Almost 20 years later, Kobayashi et al. used the same method for synthesizing linear polyoxyalkylenes in the presence of $H_2SO_4$ and $(C_2H_5)_2O \cdot BF_3$ (*S. Kobayashi, H. Tadokoro and Y. Chatani, Makromol. Chem., 1968, 112, 225-241*). Since this reaction is reversible, care must be taken when using ethers under strong acid conditions. Furthermore, some acids are highly volatile and can break down during polymerization.

Recently, Fradet et al. were able to minimize these drawbacks using ionic liquids of Brønsted acids as reaction medium and catalyst (*Zhang, S. Féret, A. Lefebvre, H. Tessier, M. Fradet, A., Chem. Commun.* 2011, 47, 11092-11094). An acidic ionic liquid combines the catalytic activity of the Brønsted acid with the high thermal stability and low vapor pressure of ionic liquids. The main drawback lies in that large amounts of these ionic liquids are required, as they also act as a reaction medium or solvent and not only as a catalyst.

Therefore, none of the aforementioned disclosures allows the efficient and simple synthesis of linear polyethers comprising monomers with less than 7 methylene units. The paper by Fradet et al., for example, describes that if 1,6-dihexanol is used as the starting material, the cyclic ether oxepane is obtained as the main product.

Ionic salts are formed by bulky organic cations and organic or inorganic anions. Ionic salts exhibit a unique combination of properties, such as their non-flammability, large electrochemical window, high thermal stability, wide liquidus range, and one of the most relevant of all a virtually non-existent vapor pressure. Additionally, ionic salts can be protic ionic salts. These salts are formed by the combination of a Brønsted acid and a Brønsted base (*V. H. Álvarez, S. Mattedi, M. Martin-Pastor, M. Aznar, M. Iglesias, Synthesis and thermophysical properties of two new protic long-chain ionic liquids with oleate anions. Fluid Phase Equilibria, 299 (2010) 42-50*). Ionic salts which are liquids at room temperature are referred to as ionic liquids.

The present application describes for the first time the surprising results derived from the use of protic ionic salts formed using a Brønsted acid and a Brønsted base as catalysts in the synthesis of polyethers from alcohols. Among the few papers described in which catalysts of this type are used, they relate only to the synthesis of polyesters (which have a structure and reactivity that are very different from those of polyethers) after lactone ring opening (*Coady, D. J. Fukushima, K. Horn, H. W. Rice, J. E. Hedrick, J. L. Chem. Commun., 2011, 47, 3105-3107; Coulembier, O. Josse, T. Guillerm, B. Gerbaux, P. Dubois, Ph. Chem. Commun., 2012, 48, 11695-11697; Garcia-Argüelles, S. Garcia, C. Serrano, M. C. Gutierrez, M. C. Ferrer, M. L. Del Mone, D. Green Chem., 2015, 17, 3632-3643*).

BRIEF DESCRIPTION OF THE INVENTION

The inventors have discovered that protic ionic salts can be used as catalysts in direct diol polymerization for obtaining polyethers in a very versatile manner. The inventors have discovered the surprising capacity protic ionic salts have as catalysts in reactions for the formation of polyethers from virtually any substance comprising at least two hydroxyl groups.

Unlike the ionic liquids used as catalysts in the state of the art, in which a combination of species with permanent positive charges is used and large amounts are required as they act at the same time as a solvent, the catalysts used in the present invention result from the combination of bases and acids for forming salts. Furthermore, the amounts to be used are significantly lower than in the case of ionic liquids.

Therefore, in a first aspect the invention relates to the use of a protic ionic salt formed by the combination of a Brønsted acid and a Brønsted base in the preparation of a polyether, wherein said polyether has formula (I) as defined herein.

A second aspect of the invention corresponds to a method for preparing a polyether comprising:
 (a) mixing at least one optionally substituted and optionally polymeric alcohol comprising at least two hydroxyl groups with a protic ionic salt formed by the combination of a Brønsted acid and a Brønsted base;
 (b) heating the mixture obtained in step (a) at a temperature comprised between 100° C. and 300° C.

The method of the invention allows obtaining a polyether using a protic ionic salt as catalyst. The polyether which is obtained can be a homopolymer or a copolymer, depending on whether the starting (polymeric or non-polymeric) alcohol is reacted with one like itself, or with at least another different type of (polymeric or non-polymeric) alcohol, respectively.

In a third aspect, the invention relates to a polyether obtainable by means of the method of the invention, preferably a copolyether, i.e., a polyether comprising at least two types of different monomer units.

A fourth aspect of the invention relates to a polyether of formula (III) as defined herein.

In a last aspect, the invention relates to the use of a polyether according to the present invention for the preparation of adhesives, polyurethane coatings, paints, polyurethane foams, water-soluble surfactants, pharmaceutically acceptable vehicles, or solid polymer electrolytes.

DETAILED DESCRIPTION OF THE INVENTION

Figure 1:
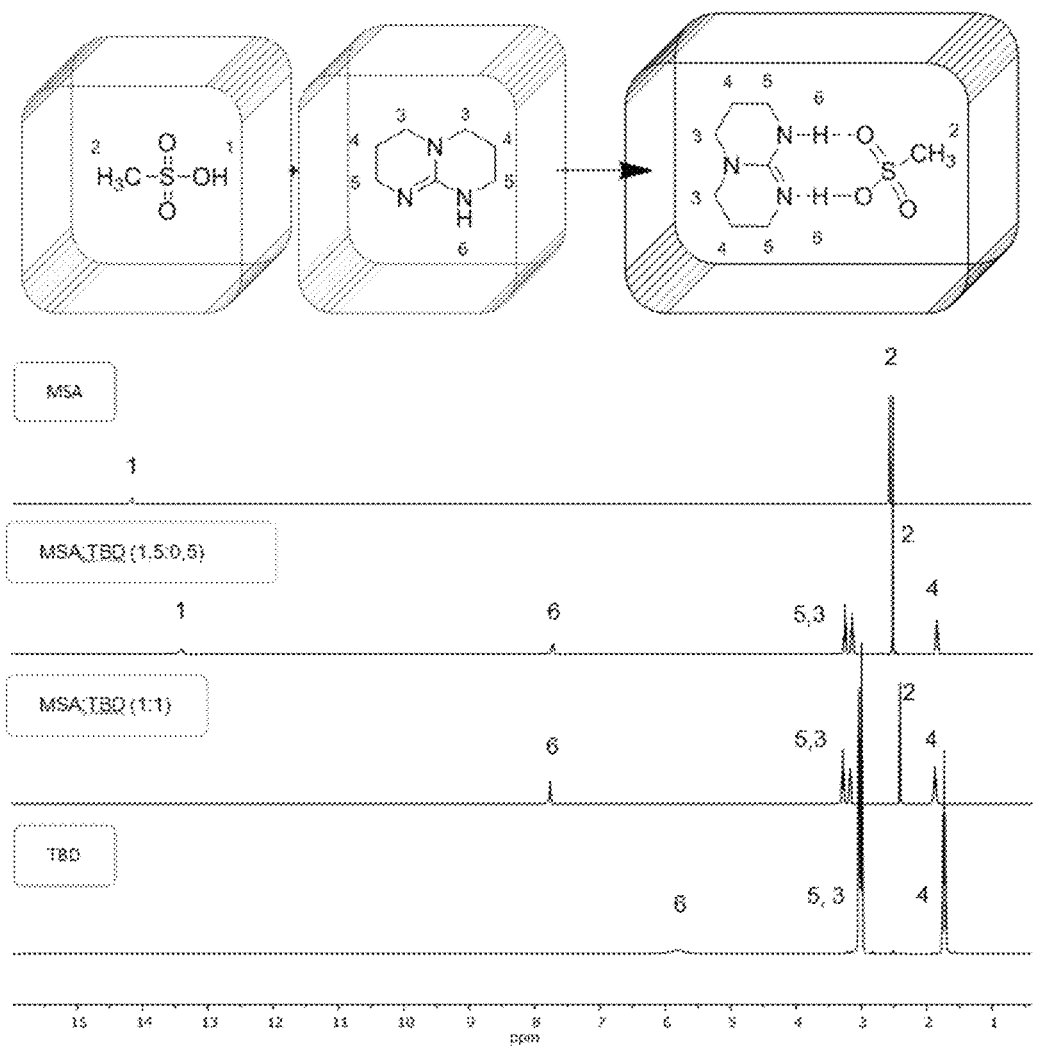
FIG. 1 shows the $^1$H-NMR (DMSO-$d_6$) of methylsulfonic acid (MSA), the base 1,5,7-triazabicyclo[4.4.0]dec-5-ene (TBD), and the ionic salt MSA:TBD (1:1) and (1.5:0.5).

The term "alkyl" refers to a linear or branched alkane derivative which does not contain any unsaturation and is bound to the rest of the molecule through a single bond. "Alkenyl" or "alkynyl" are similar to the defined alkyl but with at least one bond being a double bond or a triple bond, respectively.

In a particular embodiment, the "cycloalkyl" is a $C_3$-$C_{12}$ cycloalkyl. In this context, "$C_3$-$C_{12}$ cycloalkyl" represents 1 or 2 non-aromatic rings formed by 3 to 12 carbon atoms which can be partially unsaturated. In another particular embodiment, "cycloalkyl" is a $C_5$-$C_{12}$ cycloalkyl. According to a particular embodiment, the cycloalkyl is a radical of cyclopropane, cyclobutane, cyclopentane, cyclohexane, cycloheptane, decahydronaphthalene, octahydroindene, or octahydropentalene. 1,4-cyclohexanediol, decahydronaphthalene-1,4-diol, or 1,2,3,4,4a,5,6,7-octahydronaphthalene-2,6-diol, may be identified, for example and in a non-limiting manner, as the example of an alcohol comprising at least two hydroxyl groups derived from a $C_3$-$C_{12}$ cycloalkyl or $C_5$-$C_{12}$ cycloalkyl.

In a particular embodiment, the "aryl" is a $C_6$-$C_{12}$ aryl. In this context, "$C_6$-$C_{12}$ aryl" refers to a radical comprising 1 or 2 aromatic rings condensed together, comprising 6 to 12 carbon atoms, even more particularly 6 carbon atoms. According to a particular embodiment, aryl is a phenyl, naphthyl, indenyl, phenanthryl, or anthracyl radical, preferably phenyl or naphthyl radical. Hydroquinone or benzene-1,4-diol, 4,4'-biphenol, or naphthalene-1,5-diol may be identified, for example and in a non-limiting manner, as the example of an alcohol comprising at least two hydroxyl groups derived from a $C_6$-$C_{12}$ aryl.

In a particular embodiment, the "heterocyclyl" is a 5 to 12-membered heterocyclyl. In this context, "5 to 12-membered heterocyclyl" refers to a monocyclic or bicyclic system which can be completely or partially saturated or aromatic ("heteroaryl") containing from 5 to 12 ring members in which, specifically one, two, three, or four are heteroatoms independently selected from N, O, and S, and the remaining ring atoms being carbon. According to a particular embodiment, heterocyclyl is a radical derived from pyrrolidine, decahydroquinoline, quinoline, thiophene, or furan. Decahydroquinoline-3,7-diol may be identified, for example and in a non-limiting manner, as the example of an alcohol comprising at least two hydroxyl groups derived from a 5 to 12-membered heterocyclyl.

Throughout this specification and also in the claims, unless otherwise indicated, each group mentioned as "optionally substituted" must be understood to be a group which is substituted or not substituted in one or more available positions with one or more suitable groups such as OR', SR', SOR', SO$_2$R', OSO$_2$R', SO$_3$R', NO$_2$, N(R')$_2$, N(R') COR', N(R') SO$_2$R', CN, Cl, Br, COR', CO$_2$R', CO$_2$-M$^+$, OCOR', OCO$_2$R', OCONHR', OCON(R')$_2$, CONHR', CON (R')$_2$, linear or branched $C_1$-$C_6$ alkyl, $C_3$-$C_{10}$ cycloalkyl, $C_2$-$C_6$ alkenyl, $C_2$-$C_6$ alkynyl, $C_6$-$C_{14}$ aryl, and 5 to 12-membered heterocyclyl, in which each of the groups R' is independently selected from the group consisting of hydrogen, linear or branched $C_1$-$C_6$ alkyl, $C_3$-$C_{10}$ cycloalkyl, $C_2$-$C_6$ alkenyl, $C_2$-$C_6$ alkynyl, $C_6$-$C_{14}$ aryl, and 5 to 12-membered heterocyclyl.

Preferably, each functional group described in the preceding paragraph is independently selected from a functional group which is not adjacent to a hydroxyl group.

The term "optionally intercalated with one or more Z" means that the alkyl has at least one group Z located between two carbon atoms of the main chain. In this sense, a $C_4$ alkyl intercalated with a group Z comprises the alkyls C—Z—C—C—C, C—C—Z—C—C, and C—C—C—Z—C.

The present invention is centered on the surprising discovery that a protic ionic salt is capable of catalyzing a polyetherification reaction through the simple condensation of two molecules with at least two alcohol groups, for example, two (same or different) diols or an ether with two hydroxyl groups and a diol. Therefore, the invention allows obtaining homopolyethers or copolyethers.

As described above, the present invention requires the use of a protic ionic salt which catalyzes a polymerization reaction that gives rise to a polyether with a high yield, purity, and in a very versatile manner as it allows using different types of precursor alcohols. The many advantages include, for example, the possibility of obtaining a polyether by means of direct polymerization of alcohols having 6 carbons or less, which was not possible up until now.

Therefore, a first aspect of the present invention is centered on the use of a protic ionic salt formed by the combination of a Brønsted acid and a Brønsted base in the preparation of a polyether.

In a particular embodiment, the polyether is a polyether of formula (I) as described herein.

In one embodiment of the invention, the preparation of the polyether is performed by means of the polymerization of one or more alcohols comprising two or more hydroxyl groups.

Method

The new method for synthesizing polyethers based on the direct reaction of diols, either simple or polymeric alcohols, that is described herein for the first time, allows obtaining polymeric polyether materials without requiring other reagents, and this is achieved by reacting the (polymeric or non-polymeric) starting alcohol in the presence of a protic ionic salt as catalyst.

An aspect of the present invention therefore relates to a method for preparing polyethers, characterized in that it comprises the steps of:
(a) mixing at least one optionally substituted and optionally polymeric alcohol comprising at least two hydroxyl groups with a protic ionic salt formed by the combination of a Brønsted acid and a Brønsted base;
(b) heating the mixture obtained in step (a) at a temperature comprised between 100° C. and 300° C.

"At least one" is understood to mean "one or more". "At least two" is understood to mean "two or more". The invention is centered on the discovery that a protic ionic salt is capable of catalyzing a polyetherification reaction through the simple condensation of two molecules with at least two alcohol groups, for example, between two diols or between an ether with two hydroxyl groups and a diol. Therefore, the method does not require any additional element such as a metallic catalyst or the prior activation of the reagents.

Therefore, in a preferred embodiment the method of the invention does not comprise a metallic catalyst, preferably it does not comprise any compound with metallic elements.

Since it is an ionic salt, the catalyst of the present invention is not volatile and thereby facilitates the recovery of both the polyether and the catalyst itself. These technical advantages result in an invention with great commercial interest as it allows reducing costs by simplifying the method and allowing the reduction of raw material expenditure.

In a particular embodiment, the at least one alcohol used in step (a) of the method of the invention is independently selected from the group consisting of aliphatic alcohols, cycloaliphatic alcohols, aromatic alcohols, and heterocyclic alcohols.

Preferably, the alcohol used in step (a) of the method of the invention is an alcohol which does not comprise reactive groups that may interfere with the condensation reaction, naturally with the exception of the at least two hydroxyl groups required for the reaction. Therefore, in a preferred embodiment each group mentioned as "optionally substituted" must be understood to be a group which is substituted or not substituted in one or more available positions with one or more suitable groups such as OR', SR', SOR', $SO_2R'$, $OSO_2R'$, $SO_3R'$, $NO_2$, $N(R')_2$, N(R')COR', N(R')$SO_2R'$, CN, Cl, Br, COR', $CO_2R'$, $CO_2^-M^+$, OCOR', $OCO_2R'$, OCONHR', $OCON(R')_2$, CONHR', $CON(R')_2$, linear or branched $C_1$-$C_6$ alkyl, $C_3$-$C_{10}$ cycloalkyl, $C_2$-$C_6$ alkenyl, $C_2$-$C_6$ alkynyl, $C_6$-$C_{14}$ aryl, and 5 to 12-membered heterocyclyl, in which each of the groups R' is independently selected from the group consisting of hydrogen, linear or branched $C_1$-$C_6$ alkyl, $C_3$-$C_{10}$ cycloalkyl, $C_2$-$C_6$ alkenyl, $C_2$-$C_6$ alkynyl, $C_6$-$C_{14}$ aryl, and 5 to 12-membered heterocyclyl. In another preferred embodiment, each group mentioned as "optionally substituted" must be understood to be a group which is substituted or not substituted with hydroxyl, ketone, amide, linear or branched $C_1$-$C_6$ alkyl, and/or $C_6$-$C_{14}$ aryl.

In the present invention, each functional group described in this specification as a substituent group is preferably independently selected from a functional group which is not adjacent to a hydroxyl group.

Preferably, step (b) comprises heating the mixture obtained in step (a) at a temperature comprised between 100° C. and 300° C., preferably between 100° C. and 220° C., for at least 12 hours.

The heating time of step (b) depends on the desired degree of polymerization and can be experimentally determined by one skilled in the art according to the desired end polymer.

In a particular embodiment, step (b) comprises heating the mixture obtained in step (a) at a temperature comprised between 100° C. and 300° C. for 12 to 500 hours, preferably for 12 to 250 hours, more preferably between 12 and 150 hours.

In one embodiment of the invention, the at least one alcohol comprising two or more hydroxyl groups is selected from aliphatic alcohols, aromatic alcohols, aromatic alcohols and heterocyclic alcohols.

In a particular embodiment, the polyether obtained by means of the method of the invention is a polyether of formula (I)

HO-(A-O-)$_n$A-OH     (I)

where
n is an integer comprised between 1 and 500;
each occurrence of A is independently selected from:
    $C_3$-$C_{12}$ cycloalkyl optionally substituted with one or more groups R, C$_6$-C$_{12}$ aryl optionally substituted with one or more groups R, 5 to 12-membered heterocyclyl optionally substituted with one or more groups R, and C$_1$-C$_{34}$ alkyl optionally substituted with one or more groups R and optionally intercalated with one or more groups Z;

each occurrence of R is independently selected from the group consisting of OH, linear or branched C$_1$-C$_{12}$ alkyl optionally substituted and optionally intercalated with one or more Z, optionally substituted linear or branched C$_2$-C$_{12}$ alkenyl, optionally substituted linear or branched C$_2$-C$_{12}$ alkynyl, optionally substituted C$_6$-C$_{12}$ aryl, and optionally substituted 5 to 12-membered heterocyclyl;

each occurrence of Z is independently selected from O, S, NH, N(C$_1$-C$_6$ alkyl), C$_3$-C$_{12}$ cycloalkyl optionally substituted with one or more R, C$_6$-C$_{12}$ aryl optionally substituted with one or more R, or 5 to 12-membered heterocyclyl optionally substituted with one or more R.

In a particular embodiment, the number of repeating units or monomers in formula (I), n, is an integer comprised between 1 and 500 such that the polymer or copolymer produced by means of the method of the invention has an average molecular weight comprised between 500 and 100000 g/mol, preferably between 1000 and 50000 g/mol, measured by means of size-exclusion chromatography.

The number of repeating units n, as well as the weight of each monomer, will affect the average weight of the polyether produced in the method of the invention. The heavier a monomer is for a given value of n, the higher the average molecular weight of the obtained polymer will be.

In a particular embodiment, n is an integer comprised between 5 and 500, preferably between 5 and 300, more preferably between 5 and 200, even more preferably between 6 and 100.

In a particular embodiment, each occurrence of A is independently selected from:
C$_3$-C$_{12}$ cycloalkyl optionally substituted with one or more groups R,
C$_6$-C$_{12}$ aryl optionally substituted with one or more groups R, 5 to 12-membered heterocyclyl optionally substituted with one or more groups R, and
C$_2$-C$_{34}$ alkyl optionally substituted with one or more groups R and optionally intercalated with one or more groups Z.

In a particular embodiment, each occurrence of A is independently selected from:
C$_3$-C$_{12}$ cycloalkyl optionally substituted with one or more groups R,
C$_6$-C$_{12}$ aryl optionally substituted with one or more groups R, 5 to 12-membered heterocyclyl optionally substituted with one or more groups R,
C$_3$-C$_{34}$ alkyl optionally substituted with one or more groups R; and
C$_2$-C$_{34}$ alkyl intercalated with one or more groups Z and optionally substituted with one or more groups R.

In a particular embodiment, each occurrence of A is independently selected from C$_1$-C$_{34}$ alkyl optionally substituted with one or more R and optionally intercalated with one or more Z, C$_3$-C$_{12}$ cycloalkyl optionally substituted with one or more R, and C$_6$-C$_{12}$ aryl optionally substituted with one or more R. In another particular embodiment, each occurrence of A is independently selected from C$_1$-C$_{34}$ alkyl optionally substituted with one or more R and optionally intercalated with one or more Z and C$_3$-C$_{12}$ cycloalkyl optionally substituted with one or more R.

In a preferred embodiment, each occurrence of A is independently selected from C$_1$-C$_{34}$ alkyl, preferably C$_1$-C$_{20}$ alkyl, optionally substituted with one or more R and optionally intercalated with one or more Z. Preferably, each occurrence of A is independently selected from C$_3$-C$_{34}$ alkyl optionally substituted with one or more groups R and C$_2$-C$_{34}$ alkyl intercalated with one or more groups Z and optionally substituted with one or more groups R.

In another particular embodiment, each occurrence of R is selected from the group consisting of OH and linear or branched C$_1$-C$_{12}$ alkyl optionally substituted and optionally intercalated with one or more Z. In another particular embodiment, each occurrence of R is independently selected from the group consisting of OH and optionally substituted linear or branched C$_1$-C$_{12}$ alkyl. Preferably, the C$_1$-C$_{12}$ alkyl is not substituted. In another particular embodiment, the alkyl is linear or branched C$_1$-C$_6$ alkyl. In another particular embodiment, each occurrence of R is OH.

In a particular embodiment, each occurrence of Z is independently selected from oxygen, C$_3$-C$_{12}$ cycloalkyl optionally substituted with one or more R, or C$_6$-C$_{12}$ aryl optionally substituted with one or more R. In a preferred embodiment, Z is independently selected from oxygen, C$_3$-C$_{12}$ cycloalkyl, or C$_6$-C$_{12}$ aryl.

In a preferred embodiment, each occurrence of A is independently selected from C$_1$-C$_{34}$ alkyl, preferably C$_1$-C$_{20}$ alkyl, optionally substituted with one or more groups independently selected from OH and linear or branched C$_1$-C$_{12}$ alkyl optionally substituted and optionally intercalated with one or more Z; and optionally intercalated with one or more groups independently selected from oxygen, C$_3$-C$_{12}$ cycloalkyl optionally substituted with one or more R, and C$_6$-C$_{12}$ aryl optionally substituted with one or more R.

In another preferred embodiment, each occurrence of A is independently selected from C$_2$-C$_{34}$ alkyl, preferably C$_2$-C$_{20}$ alkyl, optionally substituted with one or more groups independently selected from OH and optionally substituted linear or branched C$_1$-C$_{12}$ alkyl; and optionally intercalated with one or more groups independently selected from oxygen, C$_3$-C$_{12}$ cycloalkyl, and C$_6$-C$_{12}$ aryl.

In another preferred embodiment, each occurrence of A is a linear unsubstituted C$_2$-C$_{34}$ alkyl, preferably C$_2$-C$_{20}$ alkyl.

In a particular embodiment, step (a) of the method of the invention comprises mixing one alcohol or, in other words, all the occurrences of A in the polyether of formula (I) are the same, and therefore the obtained polyether is a homopolymer.

In another embodiment, step (a) of the method of the invention comprises mixing two or more alcohols, preferably 2, 3, 4, 5, or 6 alcohols, more preferably 2 or 3 alcohols, even more preferably 2 alcohols. In other words, there are 2 or more occurrences of A, preferably 2, 3, 4, 5, or 6, more preferably 2 or 3, even more preferably 2 occurrences of A. In this case, the obtained polyether is a copolymer.

In a particular embodiment, step (a) of the method of the invention comprises mixing one, two, three, or four alcohols, preferably one or two.

Preferably, the at least one starting alcohol is a diol or a triol, more preferably a diol. In a particular embodiment, the at least one alcohol has the general formula (II),

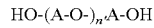   (II)

where
n' is an integer comprised between 0 and 20;
each occurrence of A is as defined above in relation to the method of the invention.

In a preferred embodiment of the invention, n' is 0 and therefore the starting alcohol is a monomeric alcohol.

In another embodiment, n' is an integer comprised between 1 and 20 and therefore the starting alcohol is a polyether alcohol.

Preferably, n' is an integer comprised between 0 and 12, more preferably between 0 and 6.

Particular and preferred embodiments of A in formula (II) are as defined above in relation to formula (I).

In a particular embodiment, the at least one starting alcohol is selected from:

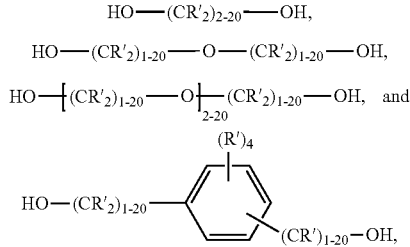

where each R' is independently selected from H, halogen, $C_1$-$C_6$ alkyl, $C_6$-$C_{14}$ aryl, 5 to 12-membered heterocyclyl, OH, O($C_1$-$C_6$ alkyl), and O($C_6$-$C_{14}$ aryl).

Representative examples of the at least one alcohol according to the present invention include, among many others, the following compounds:

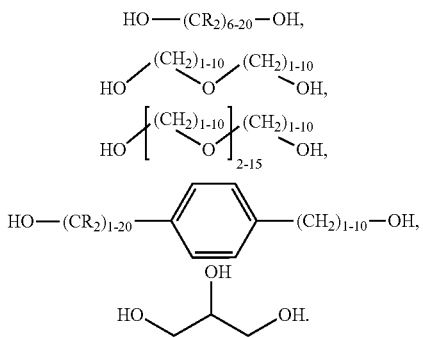

In a particular embodiment, the method of the invention is characterized in that step (b) comprises the stages of:
b1) heating the mixture obtained in step (a) at a temperature comprised between 100° C. and 150° C. for at least 12 hours; and
b2) heating the mixture obtained in step (b1) at a temperature comprised between 150° C. and 300° C. for at least 12 hours.

In a particular embodiment, step b1) is carried out for 12 to 48 hours, preferably between 12 and 36 hours.

In one embodiment, step b2) is carried out for 12 to 450 hours, preferably between 12 and 250 hours, more preferably between 12 and 150 hours.

The present invention allows obtaining a polyether. However and in a complementary manner, the obtained product can be obtained in an isolated manner.

Therefore, in a preferred embodiment the method of the invention is characterized by comprising the additional step (c), performed after step (b), which comprises cooling the reaction, preferably at a temperature between 0 and −80° C., for example by means of a dry ice bath, solid $CO_2$ in acetone, or even liquid nitrogen, for accelerating the process. In a particular embodiment, in the additional step (c) the reaction is cooled at a temperature less than −20° C., preferably a temperature less than −50° C.

In another preferred embodiment, the method of the invention is characterized by comprising the additional step (d), performed after any of steps (b) or (c), of dissolving the product in a non-polar solvent, adding a polar solvent to precipitate and filter the polyether.

In another particular embodiment of step (d), the non-polar solvent is selected from the group consisting of halogenated solvents such as chloroform or dichloromethane, alkanes such as hexane or heptane, esters such as ethyl acetate, ethers such as ethyl ether or tetrahydrofuran, and aromatic solvents such as toluene.

In another particular embodiment of step (d), the polar solvent is selected from the group consisting of protic solvents such as water or alcohols such as isopropanol, ethanol, or methanol, acetone, and nitriles such as acetonitrile.

In a particular embodiment, the reaction is carried out under an inert atmosphere.

In another particular embodiment, the reaction is carried out without a metallic catalyst.

In yet another particular embodiment, the reaction is carried out at a reduced pressure, preferably 760 mmHg to 0.1 mmHg, more preferably 760 mmHg to 10 mmHg.

In a particular embodiment, the method of the invention is a method for preparing copolymers.

Ionic Salt

The present invention lies in the discovery that a protic ionic salt formed from a Brønsted acid and a Brønsted base, i.e., an ionic salt comprising a cation which is the conjugated acid of a base and an anion which is the conjugated base of an acid, catalyzes a polymerization reaction to obtain polyethers from identical and/or different alcohols, which allows obtaining polyethers with yields and purities exceeding 90% in a simple manner and without having to use additional reagents.

The protic ionic salt to be used in the invention is a protic ionic salt formed from at least one Brønsted acid and at least one Brønsted base. In this context, the ionic salt is obtained by contacting a Brønsted acid with a Brønsted base, such that after proton transfer of at least part of the acid to the base, a salt which may be a liquid at temperatures less than 100° C. is formed.

Non-limiting examples of Brønsted bases which can be used in the invention are guanidines such as 1,5,7-triazabicyclo[4.4.0]dec-5-ene (TBD), 7-methyl-1,5,7-triazabicyclo [4.4.0]dec-5-ene (TBD), 1,4,6-triazabicyclo[3.3.0]oct-4-ene (TBO), amidines such as 1,8-diazabicyclo[5.4.0]undec-7-ene, quaternary amines such as tetrahexyl-, tetrapentyl-, tetrabutyl-, and tetramethylammonium, dimethyldiisopropylammonium, and/or cyclohexylmethylammonium, tertiary amines such as triethylamine (TEA), triphenylamine (TPA), imidazoles, pyridines such as 4-dimethylaminopyridine (DMAP), pyrrolidines, piperidines, triazoles, morpholines, phosphines, or phosphazenes Therefore, in a preferred embodiment of the method the Brønsted base which can be used in the invention is selected from the group consisting of guanidines, amidines, triethylamine, quaternary amines, imidazoles, pyridines, pyrrolidines, piperidines, triazoles, morpholines, phosphines, phosphazenes, preferably from the group consisting of 1,8-diazabicyclo[5.4.0]undec-7-ene, 1,5,7-triazabicyclo[4.4.0]dec-5-ene, triethylamine, DMAP, and mixtures thereof. In a particular embodiment, the Brønsted base forming the protic ionic salt is 1,5,7-triazabicyclo[4.4.0]dec-5-ene (TBD), DMAP, and/or triethylamine (TEA).

Non-limiting examples of Brønsted acids which can be used in the invention are derivatives of alkylsulfonic acids, perfluoroalkylsulfonic acids, p-toluenesulfonic acid, diphenylphosphoric acid, trifluoroacetic acid, acetic acid, bis (perfluoroalkylsulfonyl)imide derivatives, citric acid, and mixtures thereof, preferably from the group consisting of methanesulfonic acid, p-toluenesulfonic acid, diphenylphosphoric acid, trifluoromethanesulfonic acid, bis(trifluoromethanesulfonyl)imide derivatives, and mixtures thereof. An example of alkylsulfonic acid would be, in a non-limiting manner, methanesulfonic acid (MSA). Examples of perfluoroalkylsulfonic acids would be, in a non-limiting manner, trifluoromethanesulfonic acid, perfluorobutanesulfonic acid, perfluorooctanesulfonic acid, among others. Examples of bis(perfluoroalkylsulfonyl)imide derivatives would be, in a non-limiting manner, bis(trifluoromethanesulfonyl)imide or bis(perfluorobutylsulfonyl)imide. In a particular embodiment, the Brønsted acid forming the protic ionic salt is methanesulfonic acid (MSA) and/or p-toluenesulfonic acid (PTSA).

In a preferred embodiment, the protic ionic salt of the invention is MSA:DMAP, MSA:TBD, MSA:TEA, PTSA: TBD, PTSA:DMAP, and/or PTSA:TEA.

In one embodiment of the present invention, the protic ionic salt is characterized in that the molar proportion of the protic ionic salt, comprising both the Brønsted acid and the Brønsted base, with respect to the total amount of moles of alcohol used as precursors is between 1% and 15%, preferably between 1% and 10%, more preferably 1% to 5%. In a particular embodiment, the molar proportion is 10%. In this context, a molar proportion of 10% means that there are 0.1 moles of protic ionic salt for each total mol of precursor.

The protic ionic salt can be formed by an acid and a base, or alternatively by at least one acid and at least one base. Similarly, the stoichiometric ratio between the acid (or acids) and the base (or bases) can be other than 1:1. In the method of the present invention, the possibility of using a stoichiometric ratio between the acid (or acids) and the base (or bases) of 1-10:1 or alternatively of 1:1-10 is contemplated. In a preferred embodiment, the method of the invention is characterized in that the molar proportion between the Brønsted acid and the Brønsted base is 1:1 to 5:1, preferably 3:1.

Polyether

Throughout the present specification, the term polyether refers to both a homopolymer and a copolymer, except where explicitly indicated otherwise.

An additional aspect of the invention relates to a polyether obtainable by means of the method of the invention, preferably a copolyether, i.e., a polyether comprising at least two types of different monomer units.

In a particular embodiment, the polyether obtainable by means of the method of the invention is characterized in that it is an aliphatic or aromatic linear or branched polyether. Preferably, it is linear and aliphatic or aromatic, more preferably linear and aliphatic.

In another particular embodiment, the polyether obtainable by means of the method of the invention is characterized in that it is a copolymer. In another particular embodiment, the polyether obtainable by means of the method of the invention is characterized in that it is a homopolymer.

In another particular embodiment, the polyether obtained is a polyether of formula (I) as defined above in the present specification.

In another particular embodiment, the polyether obtainable by means of the method of the invention is a polyether of formula (III), i.e., a polyether with the structural characteristics defined throughout the present specification for the fourth aspect of the invention.

In yet another particular embodiment, the polyether of the invention or the polyether obtainable by means of the method of the invention has repeat A-O— units or monomers, comprising at least 2, 3, 4, 5, 6, 7, 8, 9, or 10 methylenes, i.e., monomers comprising at least 2, 3, 4, 5, 6, 7, 8, 9, or 10 $CH_2$ groups bound in a sequential and linear manner.

A fourth aspect of the invention relates to a polyether of formula (III)

$$HO\text{-}(A\text{-}O\text{-})_n A\text{-}OH \quad \text{(III)}$$

where n is an integer comprised between 1 and 500;

each occurrence of A is independently selected from:
$C_3$-$C_{12}$ cycloalkyl optionally substituted with one or more groups R,
$C_6$-$C_{12}$ aryl optionally substituted with one or more groups R, 5 to 12-membered heterocyclyl optionally substituted with one or more groups R,
$C_1$-$C_{34}$ alkyl optionally substituted with one or more groups R and optionally intercalated with one or more groups Z;

each occurrence of R is independently selected from the group consisting of OH, linear or branched $C_1$-$C_{12}$ alkyl optionally substituted and optionally intercalated with one or more Z, optionally substituted linear or branched $C_2$-$C_{12}$ alkenyl, optionally substituted linear or branched $C_2$-$C_{12}$ alkynyl, optionally substituted $C_6$-$C_{12}$ aryl, and optionally substituted 5 to 12-membered heterocyclyl;

each occurrence of Z is independently selected from O, S, NH, N($C_1$-$C_6$ alkyl), $C_3$-$C_{12}$ cycloalkyl optionally substituted with one or more R, $C_6$-$C_{12}$ aryl optionally substituted with one or more R, or 5 to 12-membered heterocyclyl optionally substituted with one or more R;

with the condition that A is not selected exclusively from $C_1$-$C_5$ alkyl optionally substituted with one or more R;
and with the condition that when n is less than or equal to 2, and at least one occurrence of A consists of optionally substituted $C_6$-$C_{12}$ aryl,
then the polyether comprises at least one occurrence of A other than non-substituted $C_1$-$C_{34}$ alkyl.

Particular and preferred embodiments of n, A, R, and Z are as defined above for formulas (I) and (II).

In a particular embodiment, A is not selected exclusively from $C_1$-$C_6$ alkyl optionally substituted with one or more R, $C_1$-$C_7$ alkyl optionally substituted with one or more R, $C_1$-$C_8$ alkyl optionally substituted with one or more R, $C_1$-$C_9$ alkyl optionally substituted with one or more R, or $C_1$-$C_{10}$ alkyl optionally substituted with one or more R.

Preferably, any of the conditions of the preceding paragraph only occurs when n is less than or equal to 3, 4, 5, 6, or less than or equal to 7.

In a particular embodiment, when n is less than or equal to 2 and at least one occurrence of A consists of optionally substituted $C_6$-$C_{12}$ aryl, then the polyether comprises at least one occurrence of A other than non-substituted $C_1$-$C_{34}$ alkyl. Preferably, this same condition occurs when n is less than or equal to 3, 4, 5, 6, or less than or equal to 7. In another preferred embodiment of this particular embodiment, the polyether comprises at least two, three, or four occurrences of A other than non-substituted $C_1$-$C_{34}$ alkyl.

In a particular embodiment, A is independently selected from $C_1$-$C_{34}$ alkyl optionally substituted with one or more R and optionally intercalated with one or more Z. In a preferred embodiment of the preceding embodiment, the alkyl is an alkyl with at least 3, 4, 5, 6, 7, 8, 9, 10, or 11 carbons. In another preferred embodiment, the alkyl is an alkyl with less than 34, 32, 30, 28, 26, 24, 22, or 20 carbons. In a preferred embodiment of the preceding, Z is $C_6$-$C_{12}$ aryl optionally substituted with one or more R, preferably Z is a benzene radical. Therefore, a non-limiting example of monomer that would fall within the preceding definition would be —($CH_2$-Ph-$CH_2$—O)—, where Ph is benzene.

In a particular embodiment of the fourth aspect, Z is independently selected from oxygen, $C_3$-$C_{12}$ cycloalkyl optionally substituted with one or more R, or $C_6$-$C_{12}$ aryl optionally substituted with one or more R, preferably Z is independently selected from oxygen, $C_3$-$C_{12}$ cycloalkyl, or $C_6$-$C_{12}$ aryl. In an even more preferred embodiment, Z is independently selected from oxygen, $C_6$-$C_{12}$ cycloalkyl, or $C_6$-$C_{12}$ aryl.

The number of repeating units n is used to define the number of A-O— monomers forming the polyether or copolyether of the invention.

The number of repeating units n will affect the average weight of the polymer or copolymer. Furthermore, the greater the weight of monomer A for a given value of n, the higher the average molecular weight of the polymer or copolymer will be. For this reason, in the context of the present invention one skilled in the art will know that the molecular weight comprised between 500 and 100000 g/mol, preferably between 1000 and 50000 g/mol, is the range comprising the products obtainable by means of the method of the present invention.

The method of the invention allows combining substituted or unsubstituted linear or branched alcohols comprising at least two hydroxyl groups with other identical or different alcohols in a novel and versatile manner. The immediate result of a first reaction as described in the preceding sentence is an ether comprising two monomers derived from said alcohols. Since the ether resulting from said reaction is also a compound with at least two hydroxyl groups, and since the method of the invention allows a polymerization reaction, then said ether can also be used as a precursor in the synthesis of a polyether of a higher molecular weight.

In a particular embodiment, at least one instance of A is $C_3$-$C_{34}$ alkyl substituted with one or more R. In another preferred embodiment, at least one instance of A is $C_6$-$C_{34}$ alkyl.

In a preferred embodiment, at least one instance of A is $C_3$-$C_7$ alkyl substituted with one or more R, wherein R is OH.

In a preferred embodiment, the polyether of the invention is not a polyether comprising exclusively 1,3-propanediol and 1,10-decanediol.

In another preferred embodiment, the polyether of the invention is not a homopolyether, wherein A is linear $C_7$-$C_{12}$ alkyl, preferably linear $C_6$-$C_{12}$ alkyl, even more preferably linear $C_5$-$C_{12}$ alkyl.

In a preferred embodiment of the preceding paragraph, A is substituted with one or more R.

In another particular embodiment, each group mentioned as optionally substituted is a group optionally substituted with R, wherein R is independently selected from the group consisting of OH, linear or branched $C_1$-$C_{12}$ alkyl optionally substituted and optionally intercalated with one or more Z, optionally substituted linear or branched $C_2$-$C_{12}$ alkenyl, optionally substituted linear or branched $C_2$-$C_{12}$ alkynyl, optionally substituted $C_6$-$C_{12}$ aryl, and optionally substituted 5 to 12-membered heterocyclyl, and wherein Z is independently selected from O, S, NH, N($C_1$-$C_6$ alkyl), $C_3$-$C_{12}$ cycloalkyl optionally substituted with one or more R, $C_6$-$C_{12}$ aryl optionally substituted with one or more R, or 5 to 12-membered heterocyclyl optionally substituted with one or more R.

In a preferred embodiment of the fourth aspect, the group R is independently selected from the group consisting of OH, linear or branched $C_1$-$C_{12}$ alkyl optionally substituted and optionally intercalated with one or more Z, and optionally substituted $C_6$-$C_{12}$ aryl. Preferably, the group R is independently selected from the group consisting of OH and linear or branched $C_1$-$C_{12}$ alkyl optionally substituted and optionally intercalated with one or more Z.

In another particular embodiment of the fourth aspect, the group R is independently selected from the group consisting of OH, linear or branched $C_1$-$C_6$ alkyl optionally substituted and optionally intercalated with one or more Z, and optionally substituted $C_6$-$C_{12}$ aryl, preferably from the group consisting of OH and linear or branched $C_1$-$C_6$ alkyl. In a preferred embodiment, the alkyl is linear or branched $C_1$-$C_6$ alkyl optionally intercalated with one or more Z. In another preferred embodiment, the alkyl is linear or branched $C_1$-$C_6$ alkyl.

In a particular embodiment, the polyether of the invention is a copolymer. In this sense, a copolymer means that at least one monomer A is different from the other monomer A. Alternatively, in another particular embodiment the polyether of the invention is a homopolymer, i.e., a polymer in which all the monomer units A are identical to one another.

In another particular embodiment, the monomers A are alkyl. When the polymer of the invention is such that the monomers A are exclusively alkyl, the alkyl cannot be exclusively $C_1$-$C_5$ alkyl optionally substituted with one or more R.

In a particular embodiment, the polyether is a polymer or copolymer characterized in that it is a linear and aliphatic polyether.

The method of the invention allows obtaining a polyether which may have different morphology and different functional groups, provided that these groups are not reactive when they are not OH.

INDUSTRIAL APPLICABILITY

Polyethers are industrially applicable in different fields, such as for example, in materials for foams, elastic fibers, water-soluble surfactants, pharmaceutically acceptable vehicles, solid polymer electrolytes, among many others. The method of the present invention allows obtaining very interesting polyethers based on linear 6-carbon alcohols such as poly(1,6-hexanediol), for example, which does not require ring opening for obtaining same.

Therefore, in a last aspect of the invention the use of the polyether of the invention is defined in the preparation of adhesives, polyurethane coatings, paints, polyurethane foams, water-soluble surfactants, pharmaceutically acceptable vehicles, and/or solid polymer electrolytes.

EXAMPLES

The alcohols 1,12-dodecanediol (99%, Sigma-Aldrich), 1,11-undecanediol (98%, ABCR), 1,10-decanediol (98%, Sigma-Aldrich), 1,9-nonanediol (98%, Sigma-Aldrich), 1,8-octanediol (98%, Sigma-Aldrich), 1,7-heptanediol (98%, Sigma-Aldrich) and 1,6-hexanediol (99% Sigma-Aldrich), glycerol (99%, Sigma-Aldrich), and 1,4-dimethanolbenzene (99%, Sigma-Aldrich) were used without prior purification. Methanesulfonic acid (MSA, 99%) and the base 1,5,7-triazabicyclo[4.4.0]dec-5-ene (TBD, 98%) as well as the rest of the solvents were supplied by Sigma-Aldrich and used without purification.

Example 1. Preparation of the Ionic Salt MSA:TBD 1:1

Methanesulfonic acid (MSA) was mixed in a vessel placed in an ice bath with an equal amount of the base 1,5,7-triazabicyclo[4.4.0]dec-5-ene (TBD). The mixture was heated at 60° C. for 30 minutes under stirring until obtaining a homogenous white salt. FIG. 1 shows the nuclear magnetic resonance spectrum of the product MSA:TBD 1:1.

Example 2. Preparation of the Ionic Liquid MSA:TBD 1.5:0.5

The method described in Example 1 is carried out but starting from a methanesulfonic acid (MSA) to 1,5,7-triazabicyclo[4.4.0]dec-5-ene (TBD) ratio of 1.5:0.5, respectively. The mixture was heated at 60° C. for 30 minutes under stirring until obtaining a homogenous white salt. FIG. 1 shows the nuclear magnetic resonance spectrum of the product MSA:TBD 1.5:0.5.

Example 3. Preparation of Poly(1,6-Hexanediol)

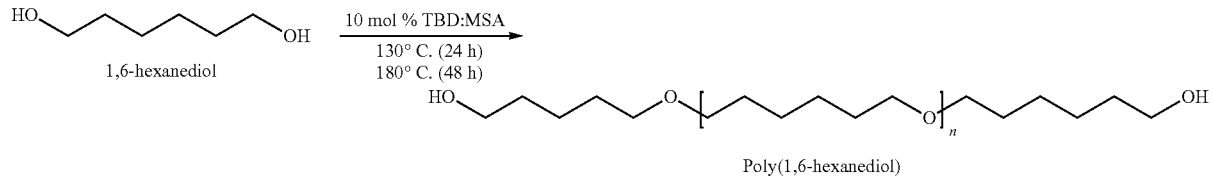

Poly(1,6-hexanediol)

Figure 2:
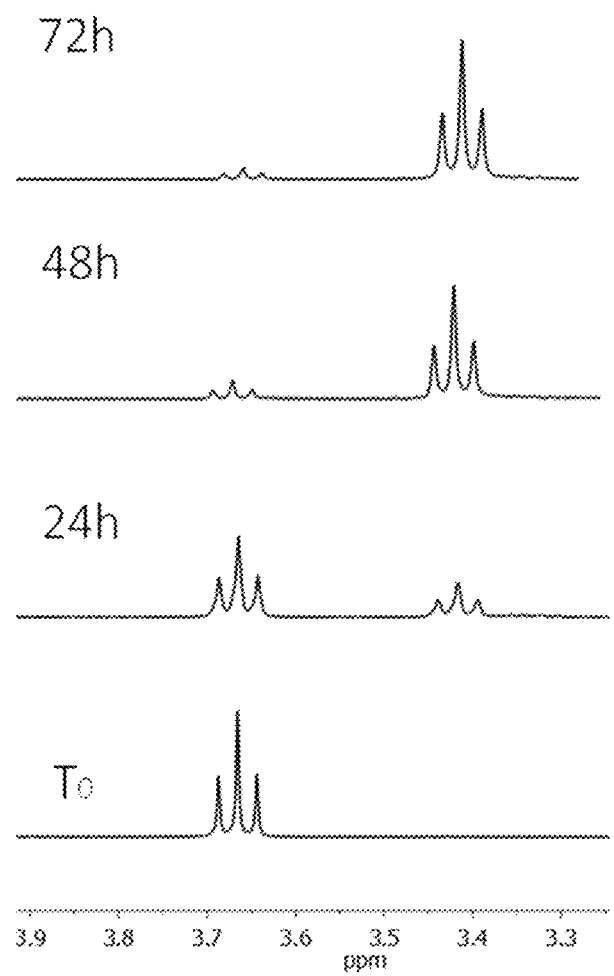
FIG. 2 shows the $^1$H-NMR (CDCl$_3$) of the polymerization reaction from 1,6-hexanediol (3.65 ppm) to poly(1,6-hexanediol) (3.40 ppm) at time 0 ($T_0$), 24 hours, 48 hours, and 72 hours.

The reaction was carried out under inert atmosphere and with magnetic stirring. 1.76 g (0.0149 mol) of 1,6-hexanediol were mixed in a 25 mL Schlenk flask with the protic ionic salt MSA:TBD (1.5:0.5) formed by 0.10 g (0.0011 mol) of MSA and 0.054 g of TBD (0.0004 mol)—MSA:TBD 1.5:0.5 (0.00149 mol in total) prepared following the method of Example 2. The flask was then submerged in an oil bath at 130° C. and subjected to vacuum to eliminate by-products such as water molecules formed during the condensation reaction. After 24 hours, the reaction temperature was raised to 180° C. and maintained up to 96 hours. The polyetherification reaction was followed by $^1$H-NMR (Bruker Avance DPX 300) in CDCl$_3$ at room temperature. The reaction (at 24, 48, 72, and 96 hours) was followed by comparing the intensity of the peaks corresponding to the hydrogen of the methylene adjacent to the hydroxyl group of the alcohol (at about 3.65 ppm) with respect to the peaks corresponding to the hydrogen of the methylene adjacent to the oxygen of the ether in the polymer (at about 3.40 ppm). The evolution of the peaks can be observed in FIG. 2.

Figure 3:
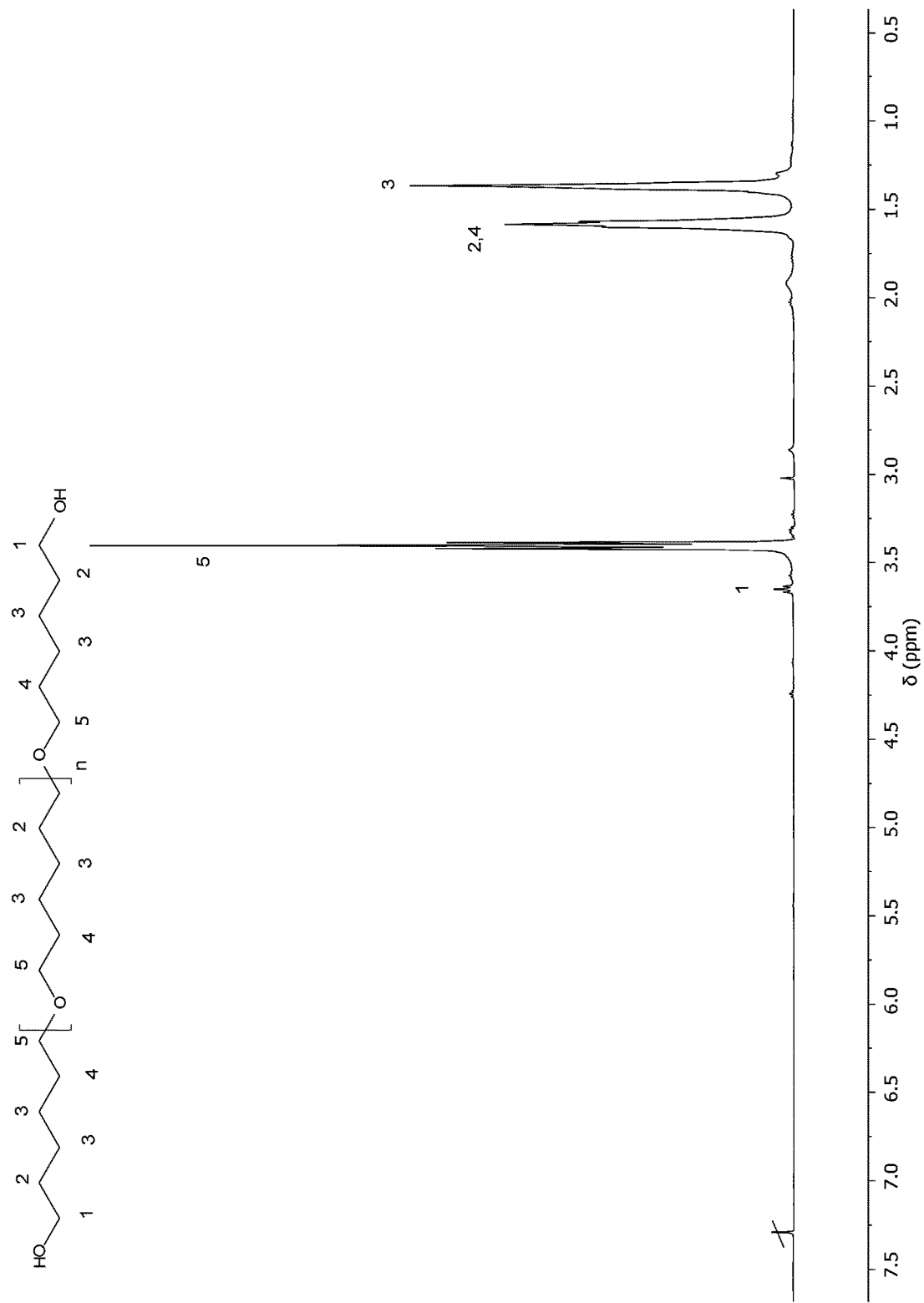
FIG. 3 shows the $^1$H-NMR (CDCl$_3$) of poly(1,6-hexanediol).
Figure 4:
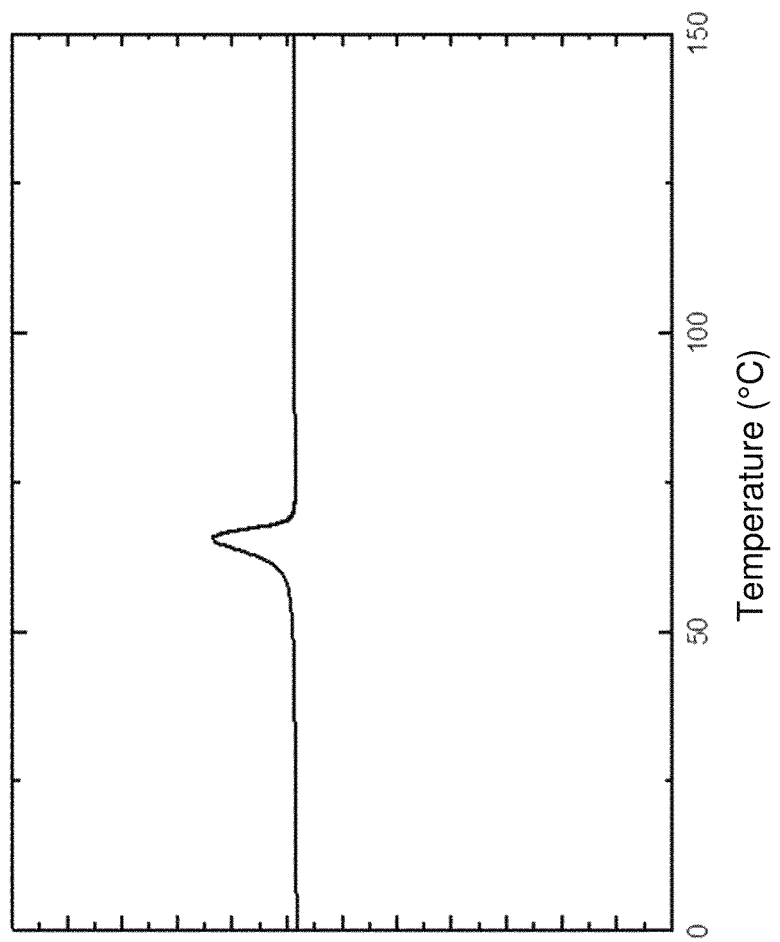
FIG. 4 shows the DSC calorimetry spectrum of poly(1,6-hexanediol).
Figure 5:
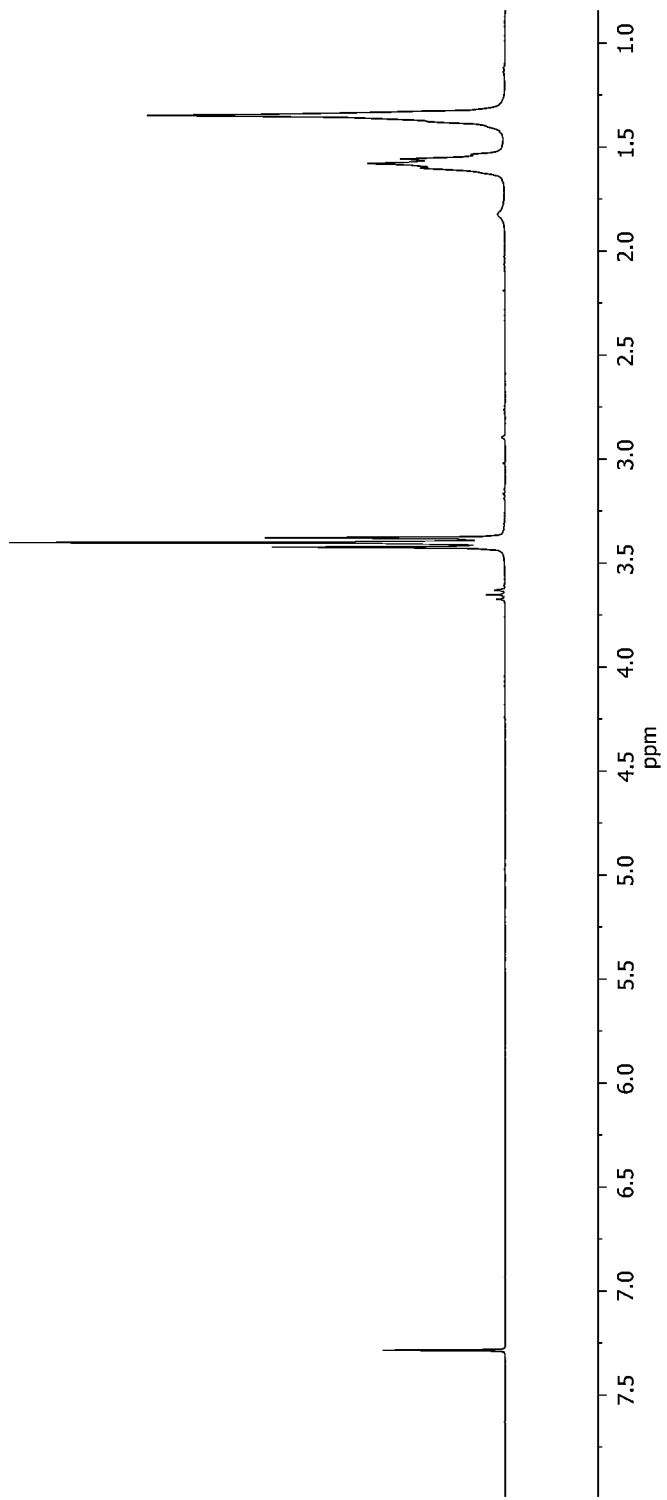
FIG. 5 shows the $^1$H-NMR (CDCl$_3$) of poly(1,7-heptanediol).
Figure 6:
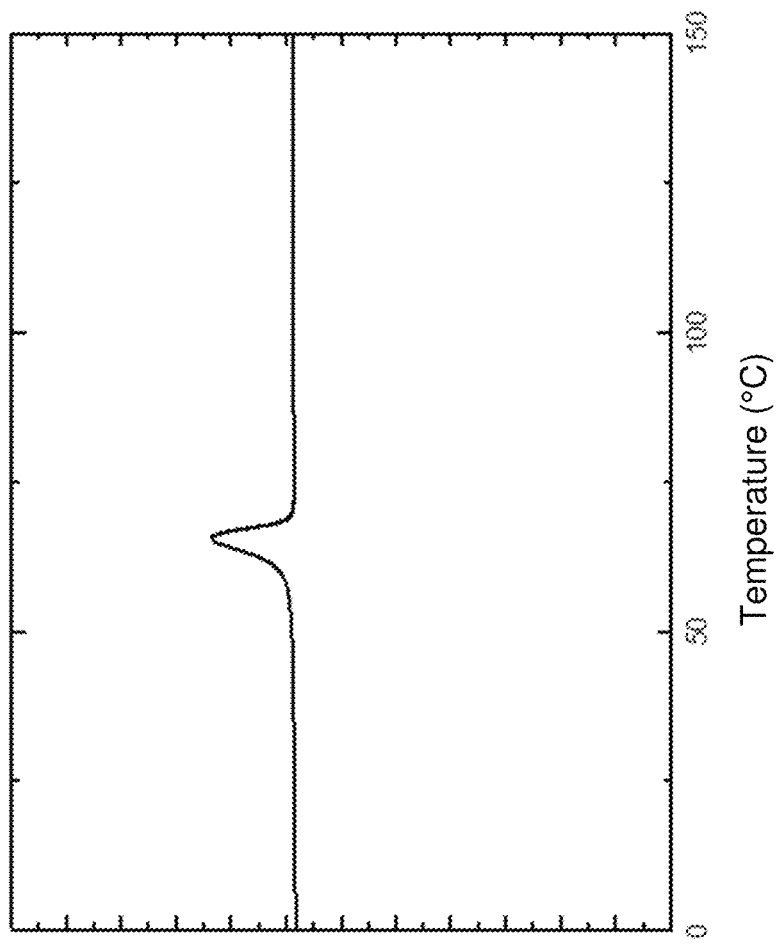
FIG. 6 shows the DSC calorimetry spectrum of poly(1,7-heptanediol).
Figure 7:
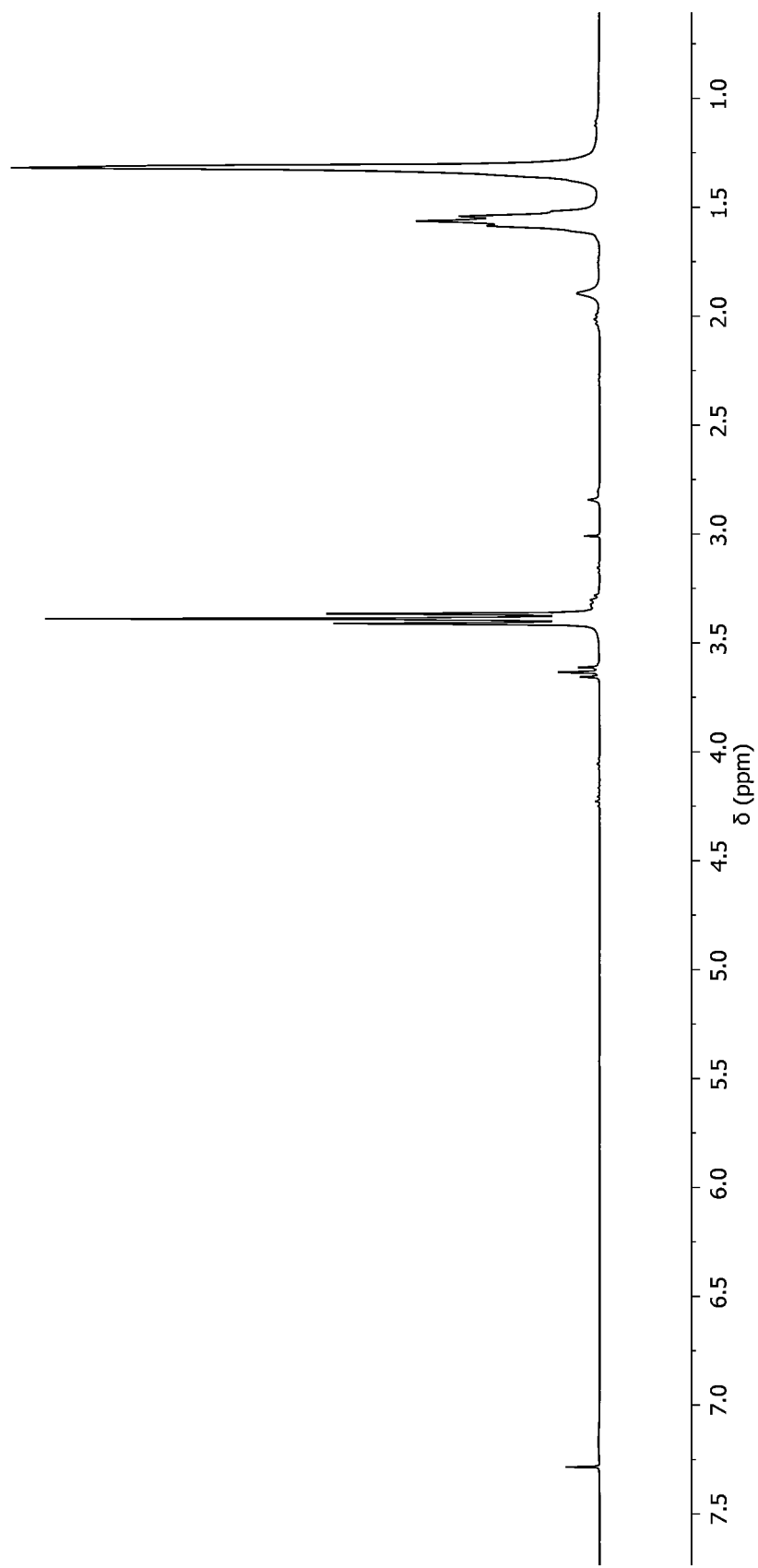
FIG. 7 shows the $^1$H-NMR (CDCl$_3$) of poly(1,8-octanediol).
Figure 8:
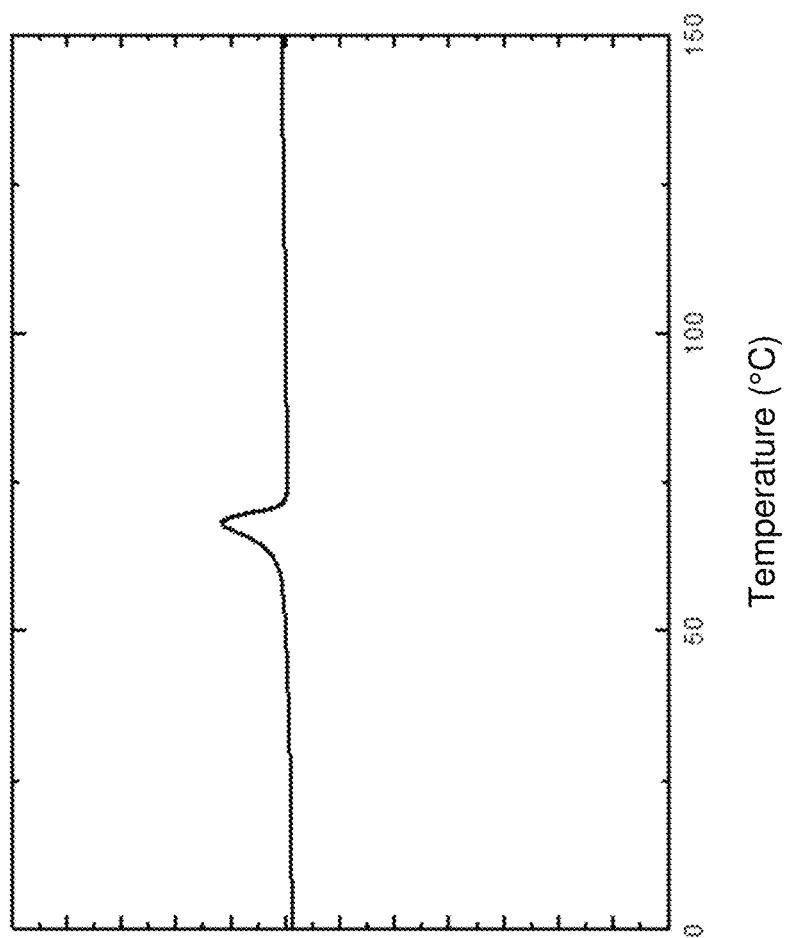
FIG. 8 shows the DSC calorimetry spectrum of poly(1,8-octanediol).
Figure 9:
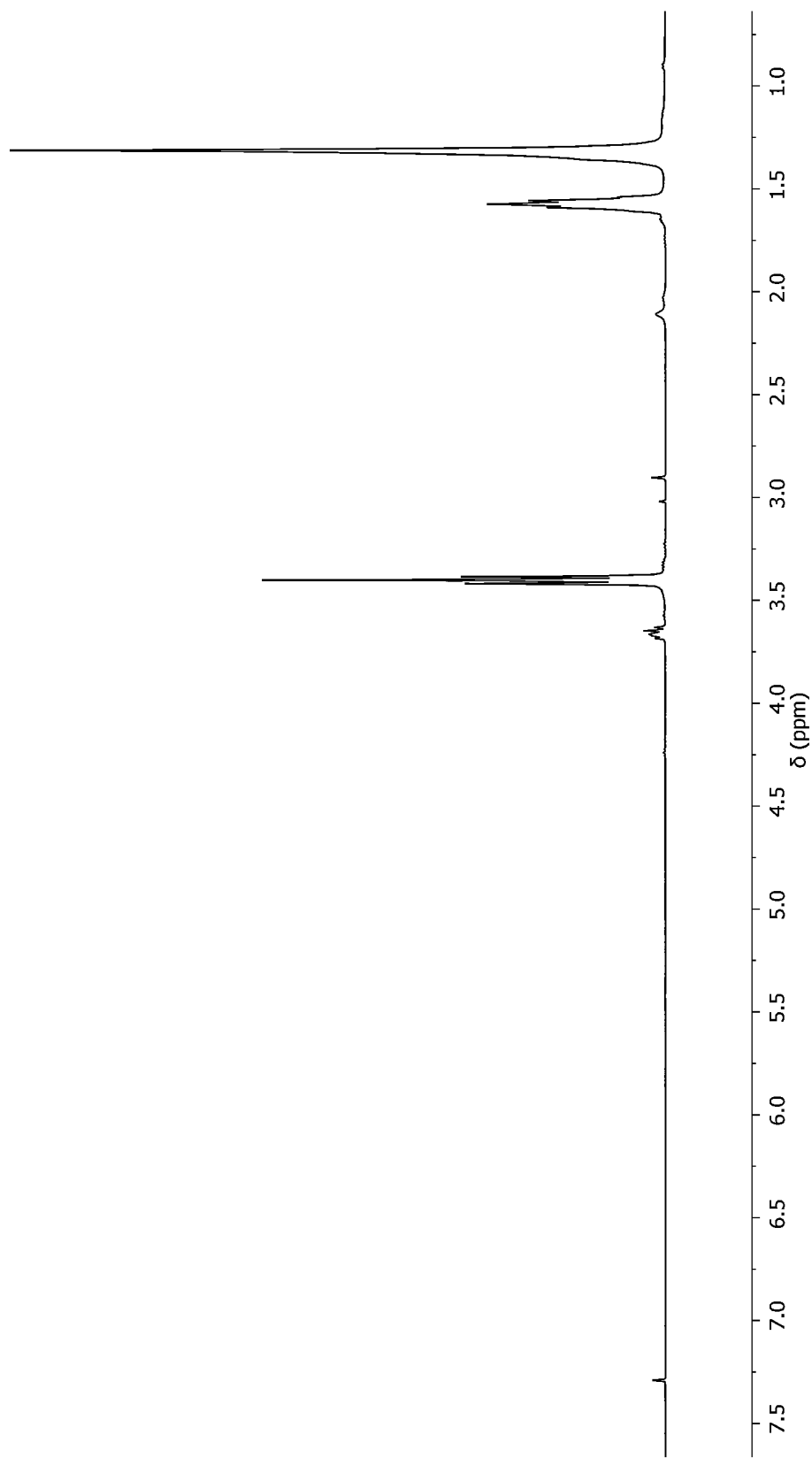
FIG. 9 shows the $^1$H-NMR (CDCl$_3$) of poly(1,9-nonanediol).
Figure 10:
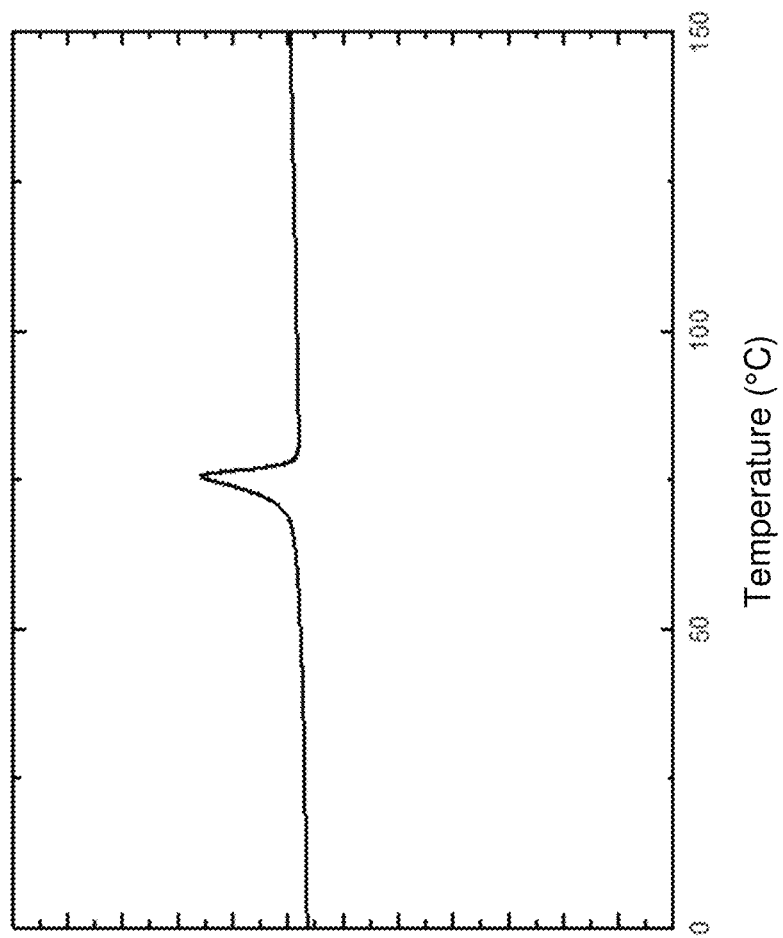
FIG. 10 shows the DSC calorimetry spectrum of poly(1,9-nonanediol).
Figure 11:
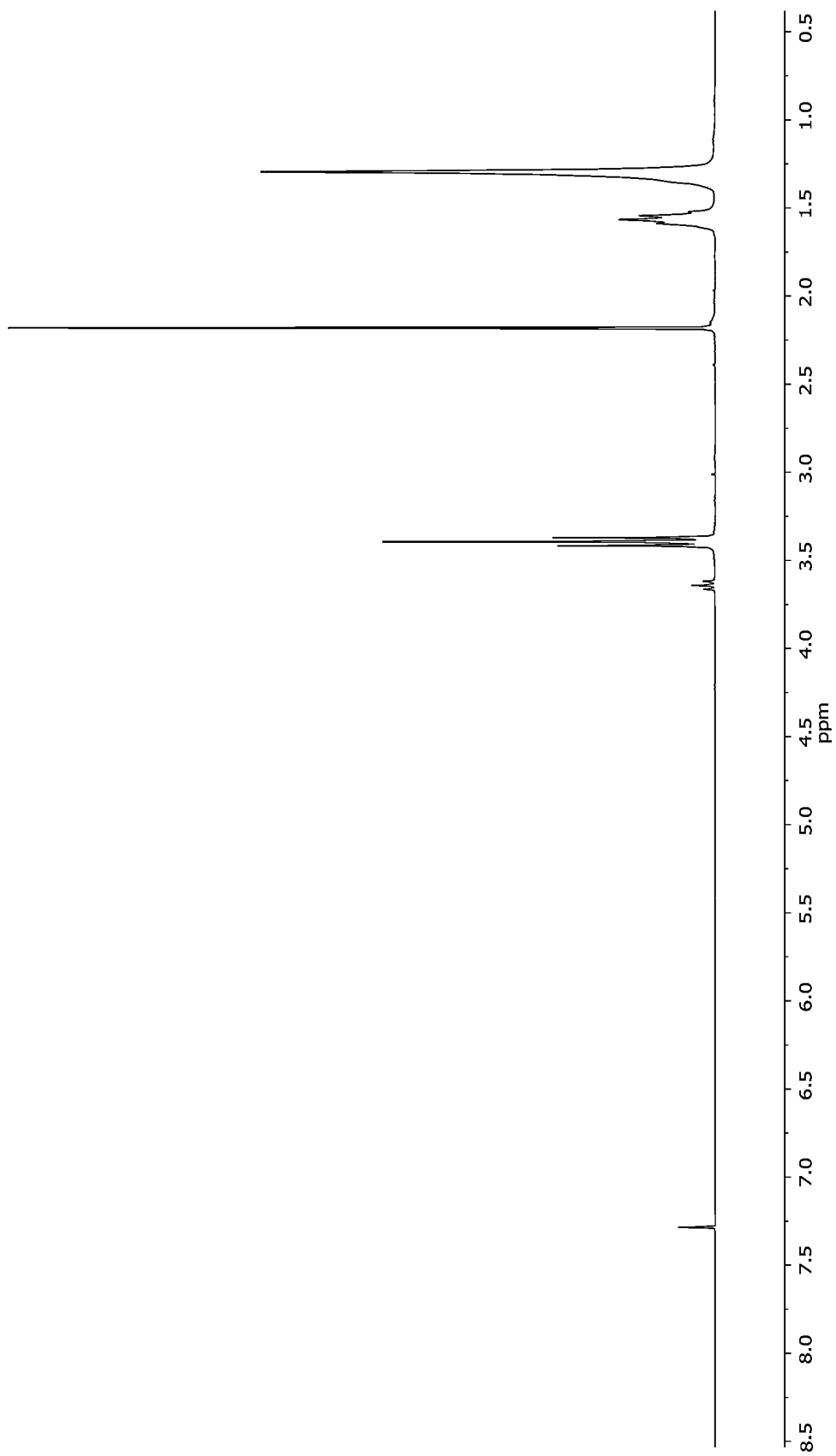
FIG. 11 shows the $^1$H-NMR (CDCl$_3$) of poly(1,10-decanediol).
Figure 12:
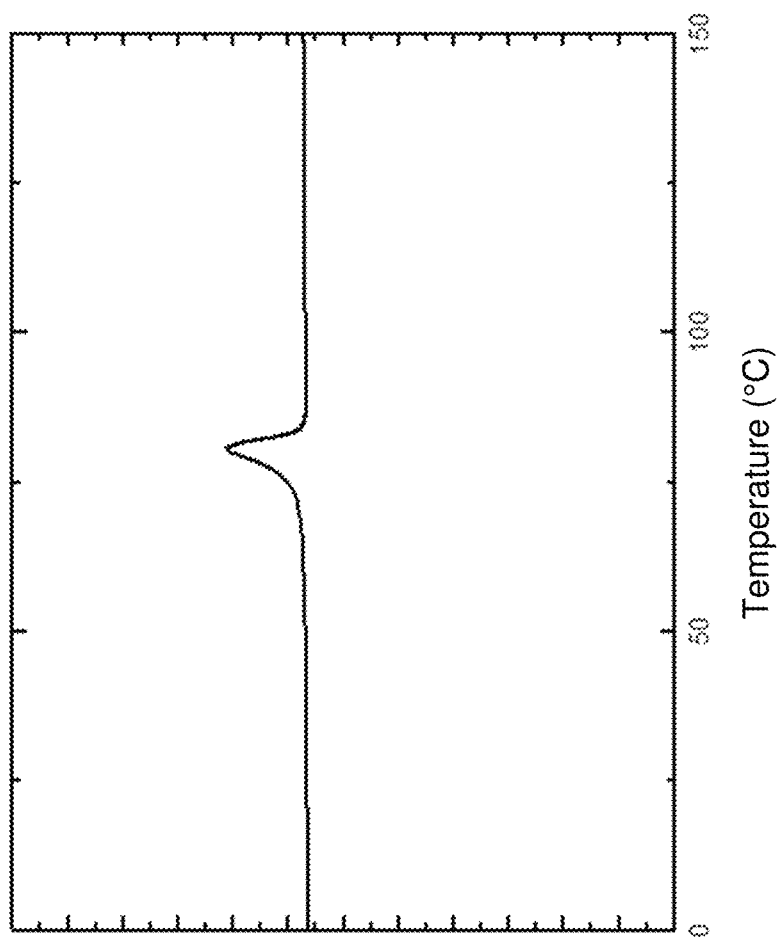
FIG. 12 shows the DSC calorimetry spectrum of poly(1,10-decanediol).
Figure 13:
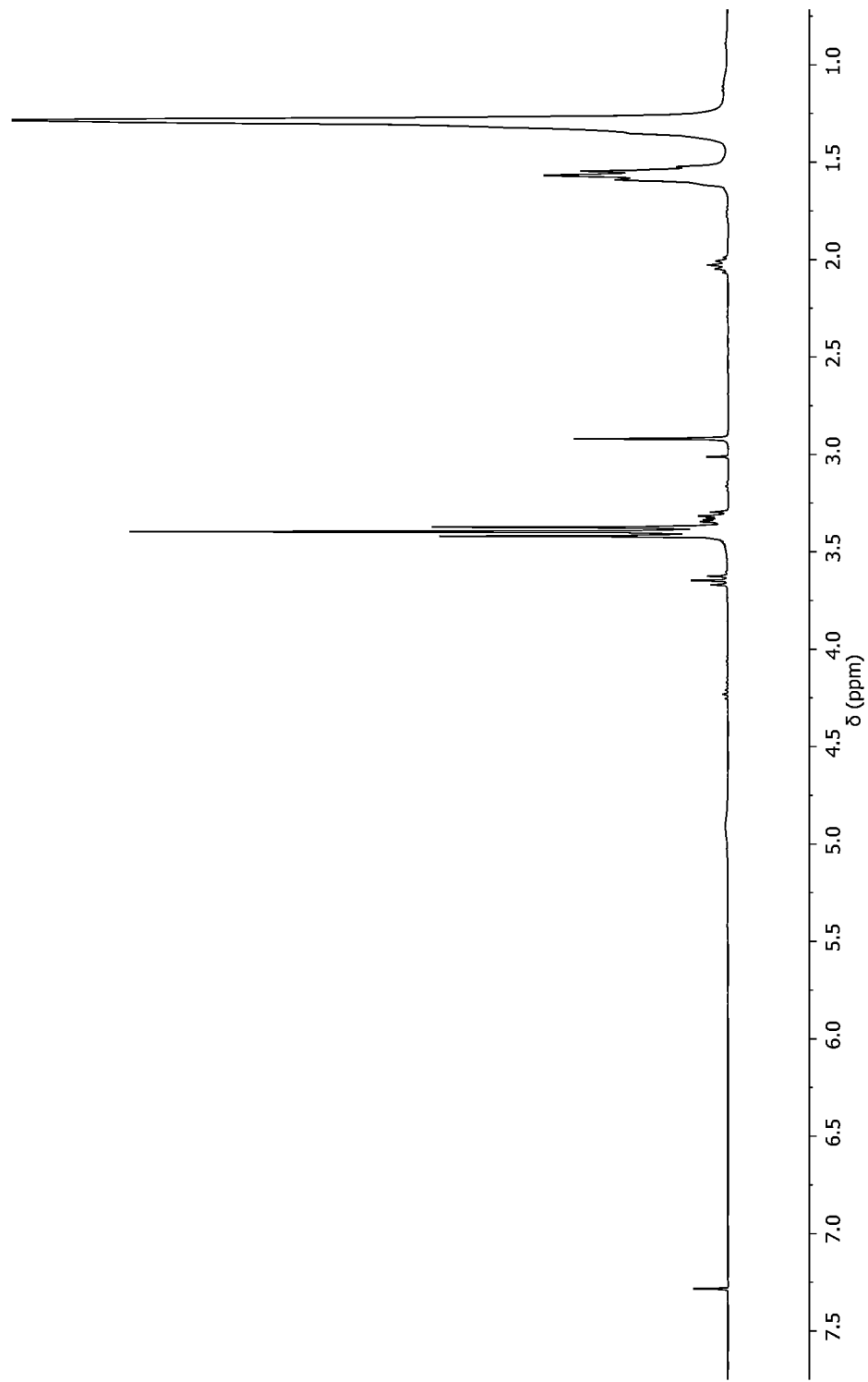
FIG. 13 shows the $^1$H-NMR (CDCl$_3$) of poly(1,11-undecanediol).
Figure 14:
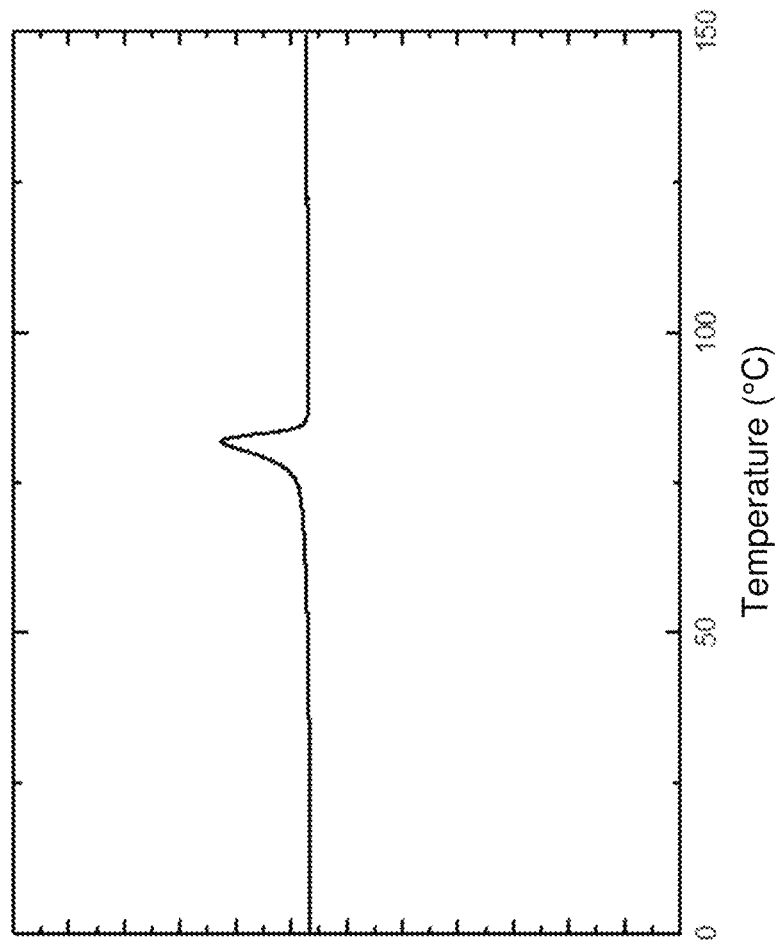
FIG. 14 shows the DSC calorimetry spectrum of poly(1,11-undecanediol).
Figure 15:
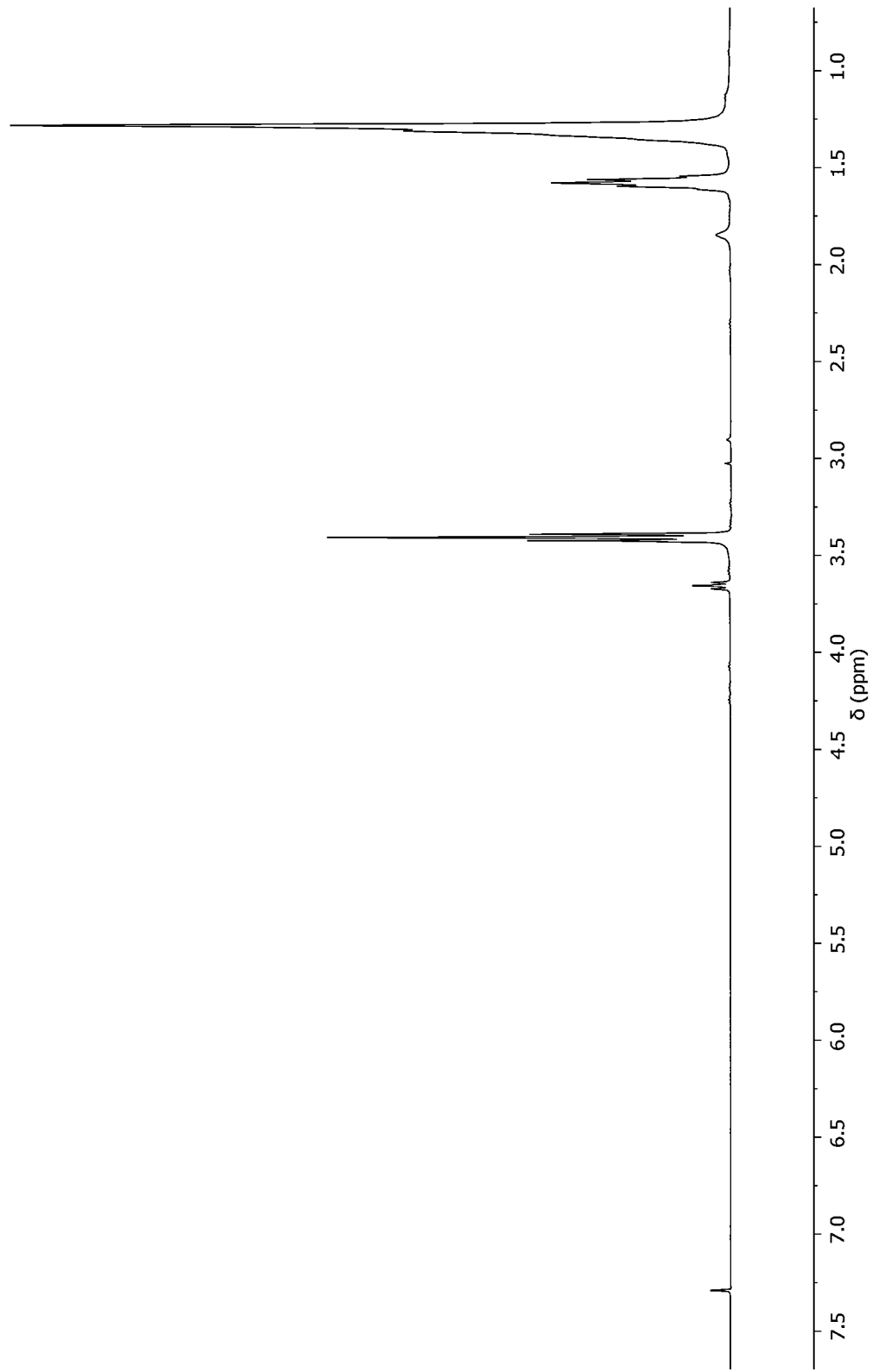
FIG. 15 shows the $^1$H-NMR (CDCl$_3$) of poly(1,12-dodecanediol).
Figure 16:
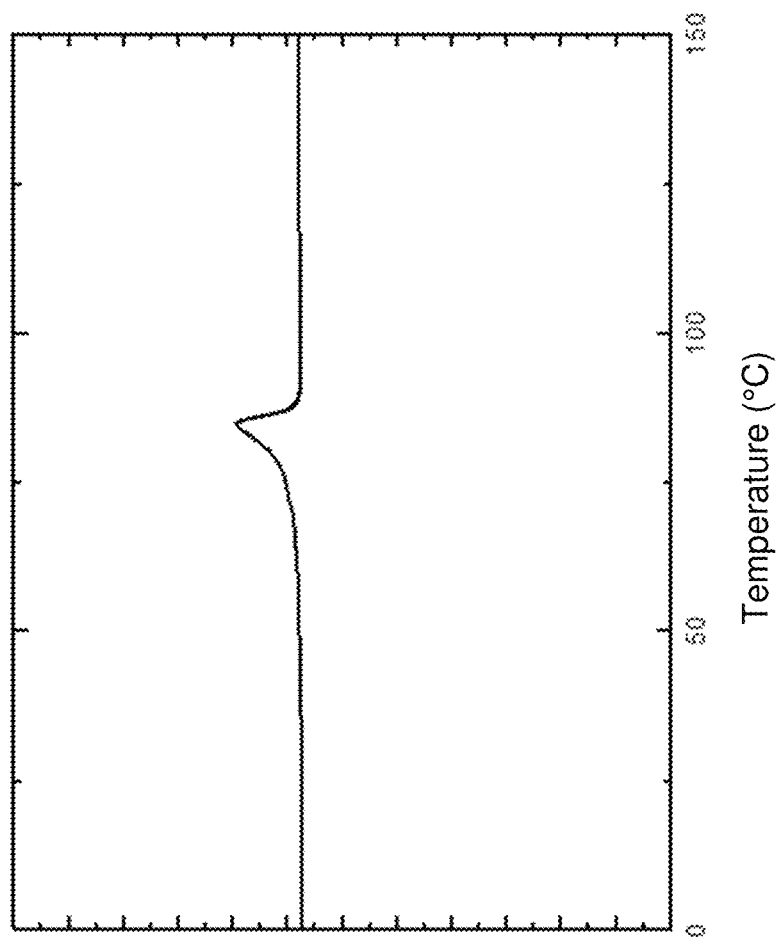
FIG. 16 shows the DSC calorimetry spectrum of poly(1,12-dodecanediol).

The reaction was stopped abruptly after immersion in a liquid nitrogen bath. For the (optional) purification of the polymer, the crude reaction product was dissolved in chloroform and precipitated with cold methanol. The precipitated polyether was filtered and vacuum-dried for 24 hours at room temperature. FIG. 3 shows the $^1$H-NMR (CDCl$_3$) spectrum and FIG. 4 shows the DSC (differential scanning calorimetry) spectrum of the product poly(1,6-hexanediol).

Example 4. Polyether Polymers Based on Diols with a Longer Chain ($C_7$ to $C_{12}$)

The method described in Example 3 was carried out but starting from other alcohols (diols) with a longer chain to give rise to polyether polymers poly(1,7-heptanediol), poly(1,8-octanediol), poly(1,9-nonanediol), poly(1,10-decanediol), poly(1,11-undecanediol), and poly(1,12-dodecanediol). Table 1 summarizes the amounts of alcohol used as well as the figures characterizing same.

Table 1. Amounts of precursor alcohol used and corresponding spectra for each synthesis of the polyether polymers poly(1,7-heptanediol), poly(1,8-octanediol), poly(1,9-nonanediol), poly(1,10-decanediol), poly(1,11-undecanediol), and poly(1,12-dodecanediol).

| Starting alcohol | Grams of alcohol (mol) | $^1$H-NMR (CDCl$_3$) FIG. | DSC FIG. |
|---|---|---|---|
| (1,7-heptanediol) | 1.97 (0.0149) | 5 | 6 |
| (1,8-octanediol) | 2.19 (0.0149) | 7 | 8 |
| (1,9-nonanediol) | 2.39 (0.0149) | 9 | 10 |
| (1,10-decanediol) | 2.60 (0.0149) | 11 | 12 |
| (1,11-undecanediol) | 2.81 (0.0149) | 13 | 14 |
| (1,12-dodecanediol) | 3.01 (0.0149) | 15 | 16 |

Table 2 summarizes the temperatures, enthalpy of fusion ($T_m$), and enthalpy of crystallization ($T_c$) obtained by means of DSC for each polyether polymer obtained in the present example, as well as for the polymer obtained in Example 3.

Table 2. Thermal properties for the polyether polymers obtained according to Examples 3 and 4 (obtained by means of DSC) poly(1,7-heptanediol), poly(1,8-octanediol), poly(1,9-nonanediol), poly(1,10-decanediol), poly(1,11-undecanediol), and poly(1,12-dodecanediol)

| Polyether | Cooling | | Heating | |
|---|---|---|---|---|
| | $T_m$ (° C.) | ΔH (J/g) | $T_c$ (° C.) | ΔH (J/g) |
| Poly(1,6-hexanediol) | 54.9 | 83 | 35 | −75 |
| Poly(1,7-heptanediol) | 65.5 | 134 | 48 | −127 |
| Poly(1,8-octanediol) | 67.9 | 125 | 50.8 | 115 |
| Poly(1,9-nonanediol) | 75.6 | 147 | 59.4 | −140 |
| Poly(1,10-decanediol) | 80.4 | 142 | 63.9 | −135 |
| Poly(1,11-undecanediol) | 81.9 | 138 | 66.2 | −128 |
| Poly(1,12-dodecanediol) | 84.7 | 166 | 68.4 | −157 |

Table 3 summarizes the average values of molecular weight obtained by means of $^1$H-NMR and size-exclusion chromatography (SEC-GPC) for each polyether polymer obtained in the present example, as well as for the polymer obtained in Example 3.

Table 3. Average molecular weight (values obtained by means of $^1$H-NMR and SEC-GPC) for the polyether polymers according to Examples 2 and 3: poly(1,7-heptanediol), poly(1,8-octanediol), poly(1,9-nonanediol), poly(1,10-decanediol), poly(1,11-undecanediol), and poly(1,12-dodecanediol).

| Polyether | Mn$^a$ (g/mol) | Mn$^b$ (g/mol) | Đ$^b$ |
|---|---|---|---|
| Poly(1,6-hexanediol) | 5000 | 22000 | 1.9 |
| Poly(1,7-heptanediol) | 4500 | 8000 | 1.4 |
| Poly(1,8-octanediol) | 2000 | 18000 | 2.3 |
| Poly(1,9-nonanediol) | 3500 | 9500 | 2.5 |
| Poly(1,10-decanediol) | 2700 | 8500 | 2.5 |
| Poly(1,11-undecanediol) | 3000 | 8000 | 2.3 |
| Poly(1,12-dodecanediol) | 2000 | 5000 | 2.5 |

$^a$Determined by means of $^1$H NMR in CDCl$_3$.
$^b$Determined by means of SEC-GPC in CDCl$_3$ using a polystyrene reference.

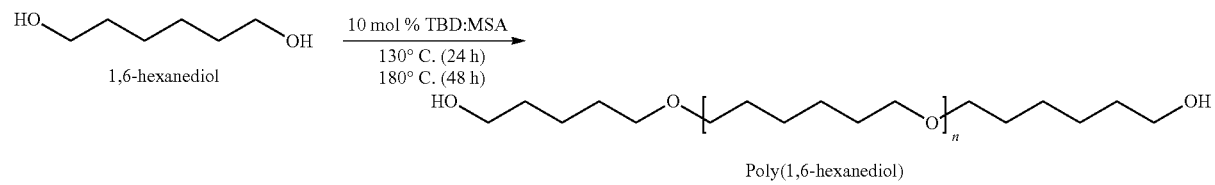

Example 5. Polyether Copolymer Based on Two Different Diols

Figure 17:
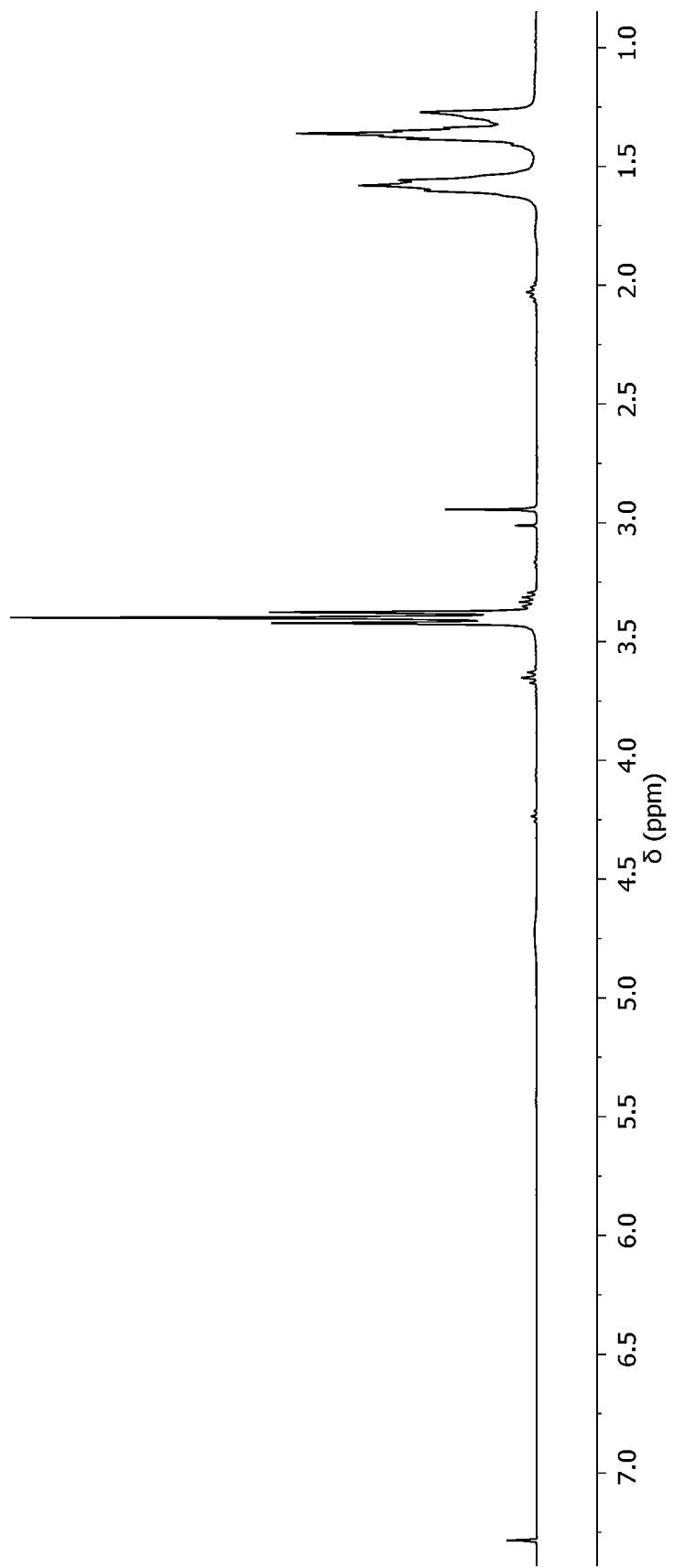
FIG. 17 shows the $^1$H-NMR (CDCl$_3$) of the copolymer obtained from 1,12-dodecanediol and 1,6-hexanediol.
Figure 18:
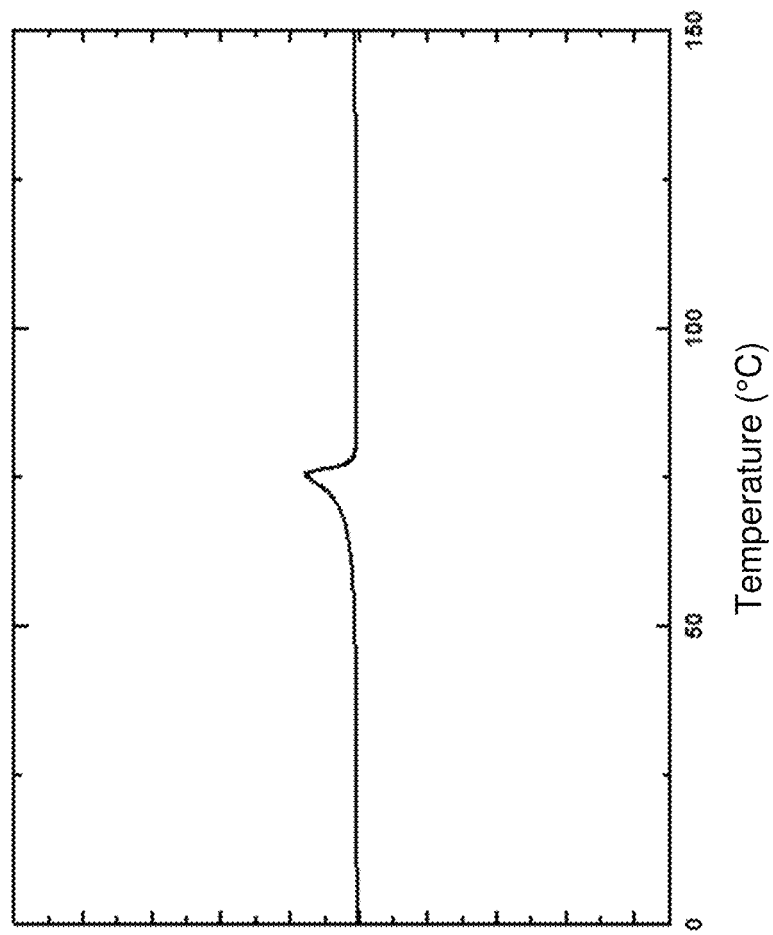
FIG. 18 shows the DSC calorimetry spectrum of the copolymer obtained from 1,12-dodecanediol and 1,6-hexanediol.

The method described in Example 3 was carried out but with the following difference. The method started with two different alcohols (diols), 1,6-hexanediol and 1,12-dodecanediol at a proportion of 6:4, respectively. In this way, 1.19 g (0.01 mol) of 1,6-hexanediol and 1.36 g (0.00676 mol) of 1,12-dodecanediol were used. The proportion of MSA:TBD used also corresponds to that described in Example 3. The resulting copolymer was characterized by means of $^1$H-NMR (FIG. 17) and DSC (FIG. 18)

Example 6. Preparation of Poly(1,6-Hexanediol) Using Different Ionic Salts

Figure 19:
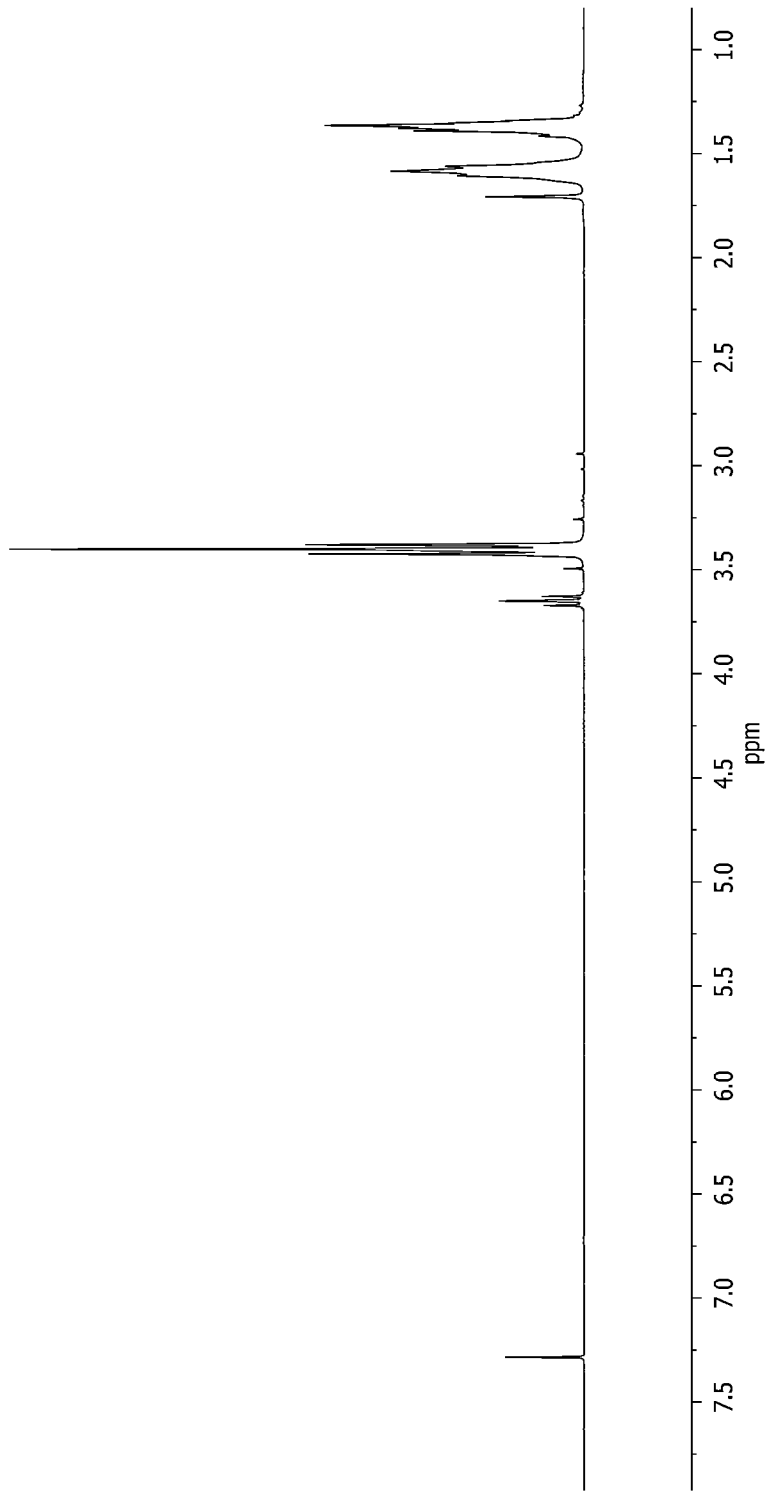
FIG. 19 shows the $^1$H-NMR (CDCl$_3$) of poly(1,6-hexanediol) obtained using MSA:DMAP 1.5:0.5.
Figure 20:
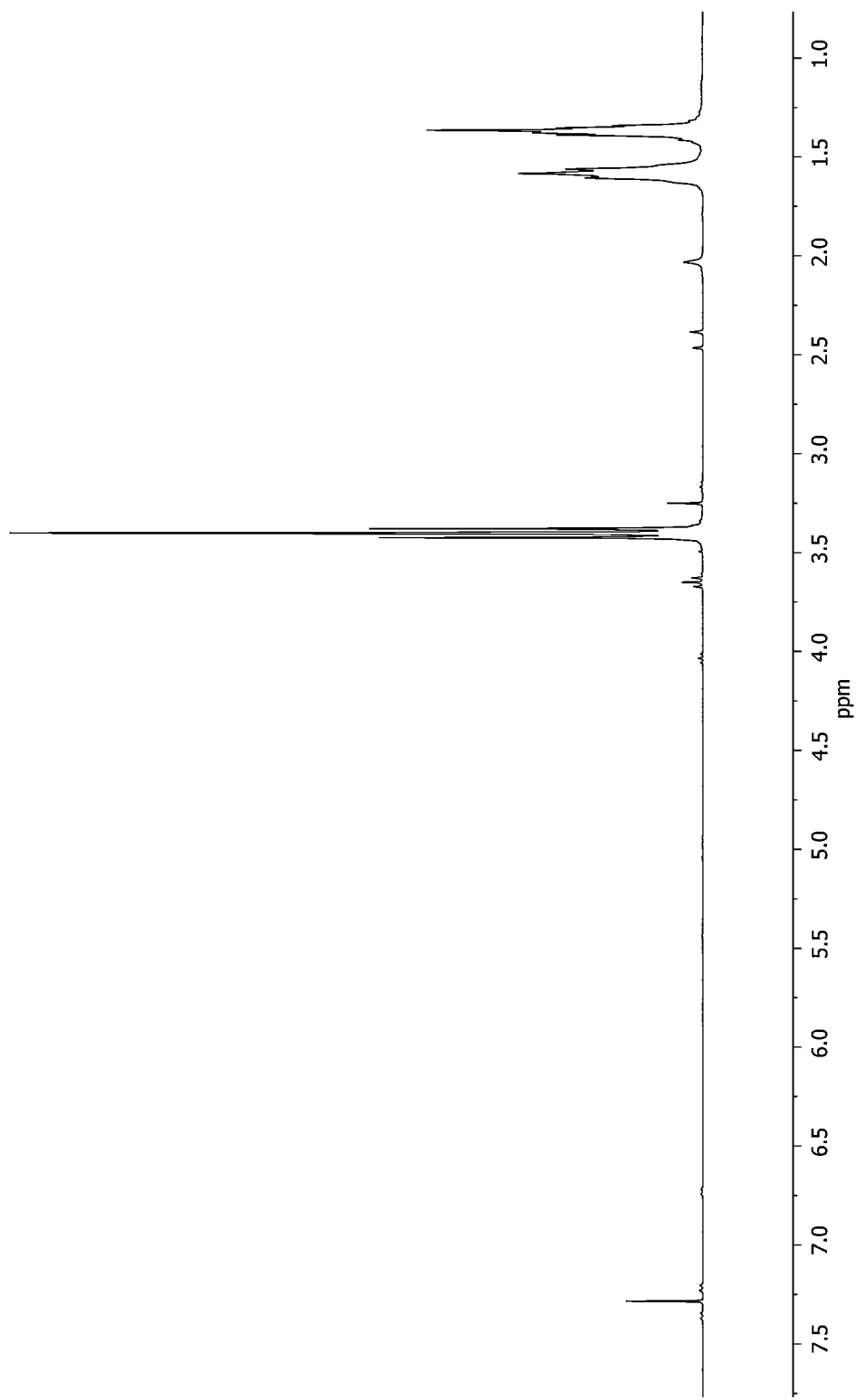
FIG. 20 shows the $^1$H-NMR (CDCl$_3$) of poly(1,6-hexanediol) obtained using PTSA:DMAP 1.5:0.5.

This example describes the preparation of the polymer from 1,6-hexanediol described in Example 3 but using a different protic ionic salt, in which MSA:DMAP 1.5:0.5 or PTSA:DMAP 1.5:0.5 is used. The only difference with respect to the method described in Example 3 lies in the protic ionic salt used, which in one case was prepared using 0.10 g (0.0011 mol) of MSA and 0.054 g (0.0004 mol) of DMAP, and in the other case was prepared using 0.18 g (0.0011 mol) of PTSA and 0.054 g (0.0004 mol) of DMAP. FIGS. 19 and 20 show the $^1$H-NMR (CDCl$_3$) spectrum of the product poly(1,6-hexanediol) obtained using the ionic salt MSA:DMAP and PTSA:DMAP, respectively.

Example 7. Preparation of Poly(1,6-Hexanediol) Using MSA:DMAP (1:1)

Figure 21:
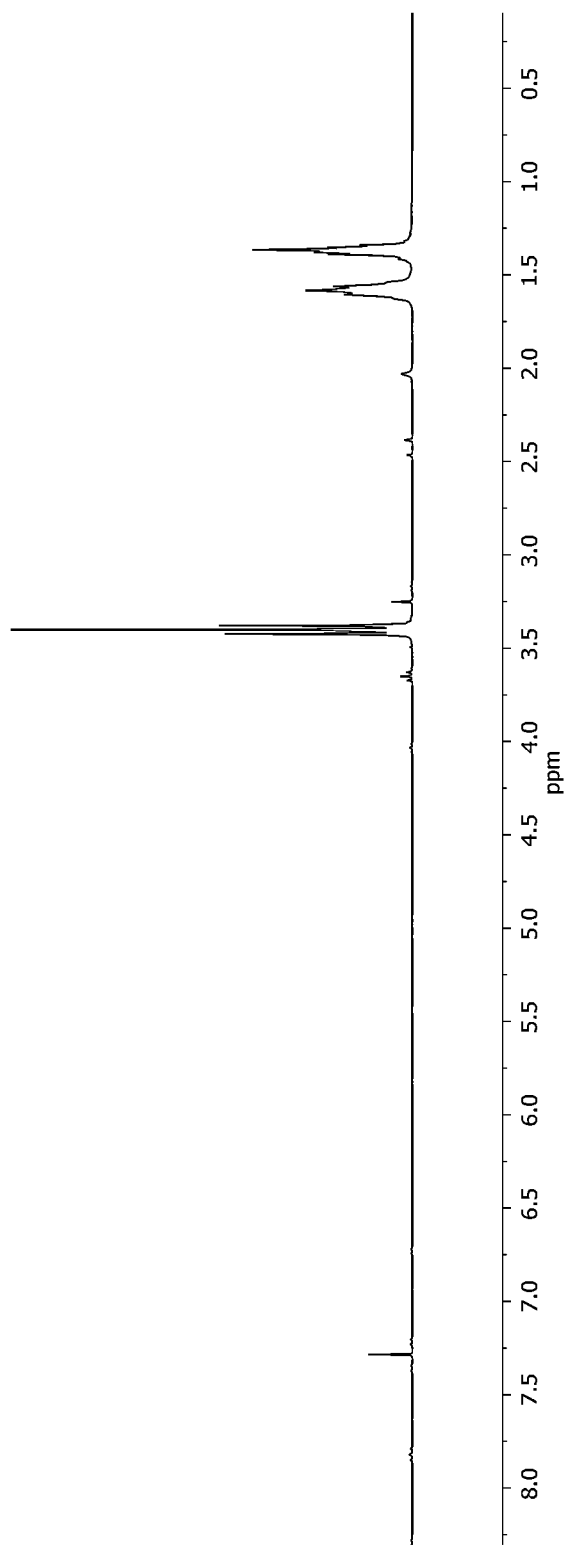
FIG. 21 shows the $^1$H-NMR (CDCl$_3$) of poly(1,6-hexanediol) obtained using MSA:DMAP 1:1.

This example describes the preparation of the polymer from 1,6-hexanediol described in Example 3 but using a protic ionic salt formed by an acid and a base in equal parts (MSA:DMAP 1:1) prepared following the method of Example 1. The only difference with respect to the method described in Example 3 lies in the protic ionic salt used, which in this case was prepared by mixing 0.07 g (0.000744 mol) of MSA with 0.09 g (0.000744 mol) of DMAP (MSA:DMAP 1:1) FIG. 21 shows the $^1$H-NMR (CDCl$_3$) spectrum of the product poly(1,6-hexanediol) obtained using the ionic salt MSA:DMAP (1:1).

Example 8 Large-Scale Preparation of Poly(1,6-Hexanediol) Using MSA:TBD 1.5:0.5

The reaction was carried out under inert atmosphere and with magnetic stirring. 300 g (2.53 mol) of 1,6-hexanediol were mixed in a 500 mL Schlenk flask with the protic ionic salt formed by 18.2 g (0.19 mol) of MSA and 8.76 g of TBD (0.063 mol)—MSA:TBD 1.5:0.5 (0.0253 mol in total). The flask was then submerged in an oil bath at 130° C. and subjected to vacuum to eliminate by-products such as water molecules formed during the condensation reaction. After 24 hours, the reaction temperature was raised to 180° C. and maintained up to 72 hours. The product was isolated following the same protocol of Example 2.

Figure 22:
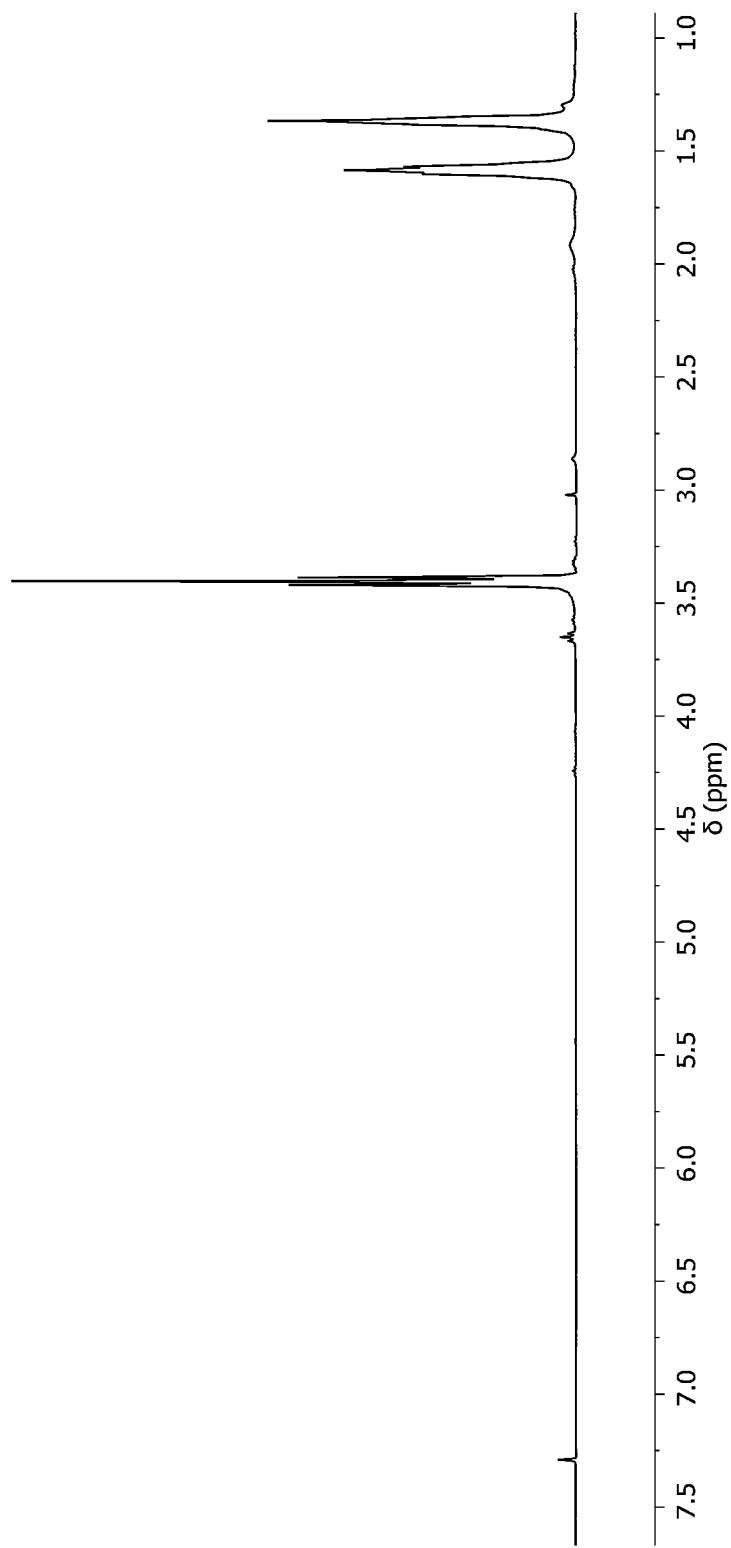
FIG. 22 shows the $^1$H-NMR (CDCl$_3$) of poly(1,6-hexanediol) obtained using MSA:TBD 1.5:0.5.

FIG. 22 shows the $^1$H-NMR (CDCl$_3$) spectrum of the product poly(1,6-hexanediol).

Table 4 shows the average molecular weights of the polymer as it was gradually isolated over the reaction time.

Table 4. Average molecular weight (values obtained by means of $^1$H-NMR and SEC-GPC) for the polyether polymer poly(1,6-hexanediol) over the reaction time.

| Reaction time (hours) | Mn$^a$ (g/mol) | Mn$^b$ (g/mol) | Đ$^b$ |
|---|---|---|---|
| 24 | 900 | 800 | 1.3 |
| 48 | 1300 | 1300 | 1.7 |
| 72 | 1800 | 2740 | 1.8 |

$^a$Determined by means of $^1$H NMR in CDCl$_3$.
$^b$Determined by means of SEC-GPC in CDCl$_3$ using a polystyrene reference.

Figure 23:
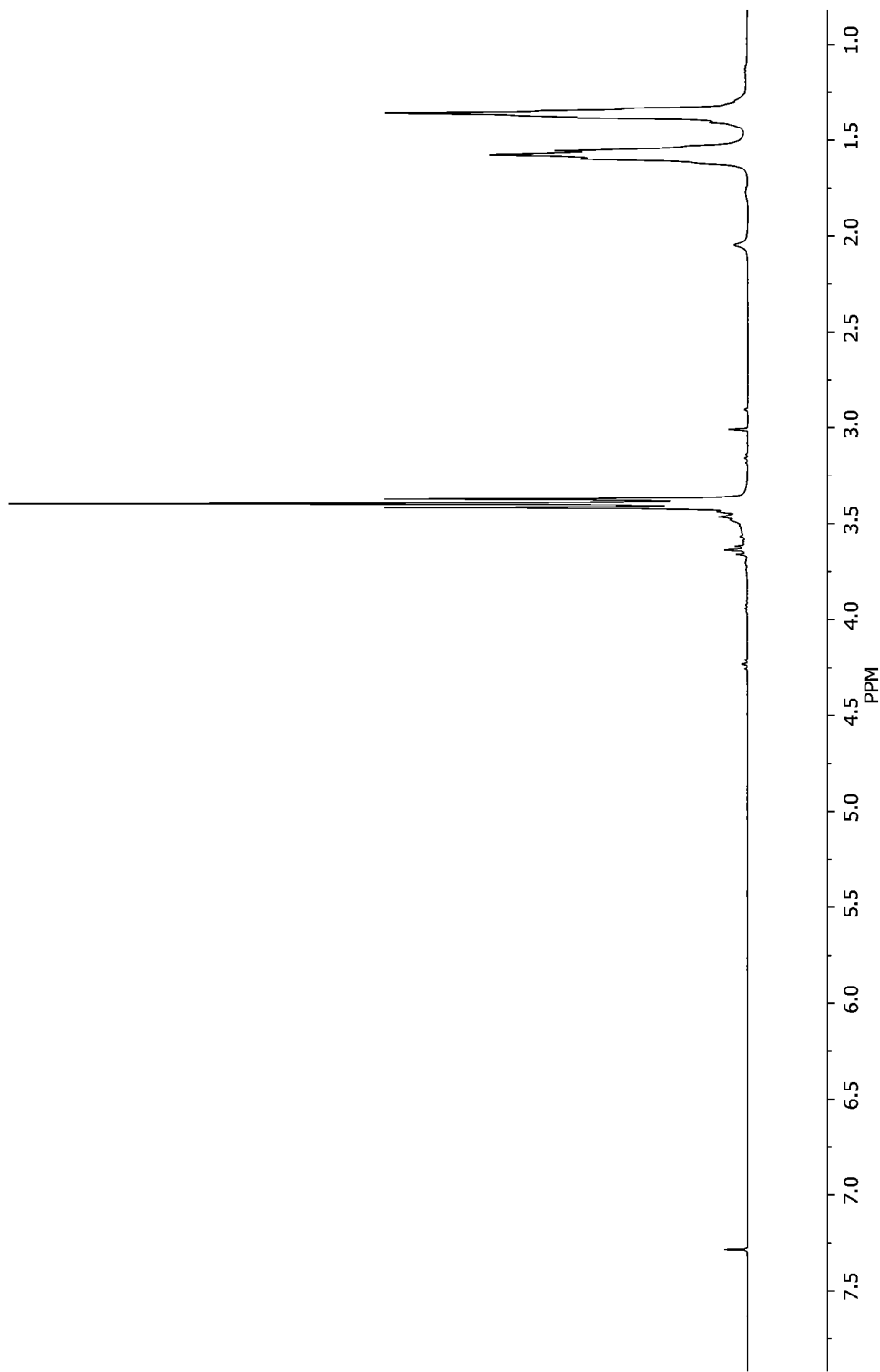
FIG. 23 shows the $^1$H-NMR (CDCl$_3$) of the copolymer obtained from glycerol and 1,6-hexanediol.

Example 9. Preparation of a Copolymer Obtained from Glycerol and 1,6-Hexanediol The method described in Example 5 was carried out but with the following differences. The method started with two different alcohols, glycerol and 1,6-hexanediol at a proportion of 2:8, respectively. Therefore, 0.46 g (5×10$^{-3}$ mol) of glycerol and 2.3 g (0.02 mol) of 1,6-hexanediol were used. A proportion of MSA:TBD equal to that described in Example 4, specifically a proportion of MSA:TBD of 1.5: 0.5, was used. Therefore, 0.18 g ($1.87 \times 10^{-3}$ mol) of MSA and 0.08 g ($6.25 \times 10^{-4}$ mol) of TBD were used. The resulting copolymer was characterized by means of $^1$H-NMR (FIG. 23).

Figure 24:
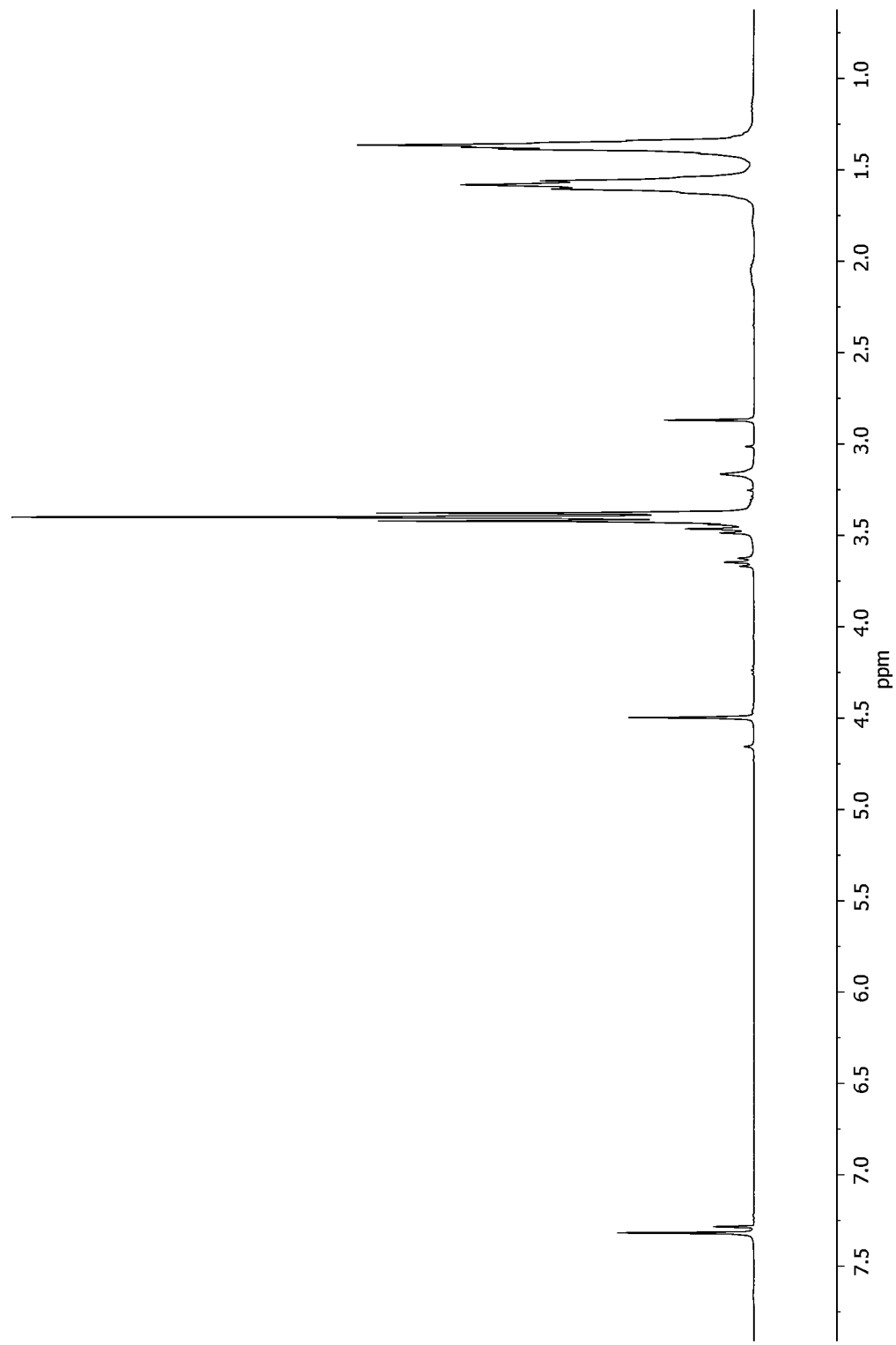
FIG. 24 shows the $^1$H-NMR (CDCl$_3$) of the copolymer obtained from 1,4-benzenedimethanol and 1,6-hexanediol.

Example 10. Preparation of a Copolymer Obtained from 1,4-Benzenedimethanol and 1,6-Hexanediol This example describes the preparation of the copolymer described in Example 9 but using 1,4-benzenedimethanol and 1,6-hexanediol. To that end, 0.69 g ($5 \times 10^{-3}$ mol) of 1,4-benzenedimethanol and 2.3 g (0.02 mol) of 1,6-hexanediol were used. A proportion of MSA:TBD equal to that described in Example 4, specifically a proportion of MSA: TBD of 1.5:0.5, was used. Therefore, 0.18 g ($1.87 \times 10^{-3}$ mol) of MSA and 0.08 g ($6.25 \times 10^{-4}$ mol) of TBD were used. The resulting copolymer was characterized by means of $^1$H-NMR (FIG. 24)

The invention claimed is:

1. A method for preparing a polyether, comprising the steps of:
   a) mixing at least one optionally substituted and optionally polymeric alcohol comprising at least two terminal hydroxyl groups with a protic ionic salt formed by the combination of a Brønsted acid and a Brønsted base, wherein the molar proportion of the protic ionic salt with respect to the total amount of moles of the alcohol is between 1 to 15%;
   b) heating the mixture obtained in step (a) at a temperature comprised between 100° C. and 300° C.

2. The method according to claim 1, wherein the at least one alcohol comprising two or more terminal hydroxyl groups is selected from the group consisting of aliphatic alcohols, aromatic alcohols and heterocyclic alcohols.

3. The method according to claim 1, wherein the at least one alcohol comprising two or more terminal hydroxyl groups is an alcohol of formula (II):

(II)

where
n' is an integer comprised between 0 and 20;
each occurrence of A is independently selected from:
   $C_3$-$C_{12}$ cycloalkyl optionally substituted with one or more groups R,
   $C_6$-$C_{12}$ aryl optionally substituted with one or more groups R,
   5 to 12-membered heterocyclyl optionally substituted with one or more groups R, and
   $C_1$-$C_{34}$ alkyl optionally substituted with one or more groups R and optionally intercalated with one or more groups Z;
each occurrence of R is independently selected from the group consisting of OH, linear or branched $C_1$-$C_{12}$ alkyl optionally substituted and optionally intercalated with one or more Z, optionally substituted linear or branched $C_2$-$C_{12}$ alkenyl, optionally substituted linear or branched $C_2$-$C_{12}$ alkynyl, optionally substituted $C_6$-$C_{12}$ aryl, and optionally substituted 5 to 12-membered heterocyclyl;
each occurrence of Z is independently selected from O, S, NH, N($C_1$-$C_6$ alkyl), $C_3$-$C_{12}$ cycloalkyl optionally substituted with one or more R, $C_6$-$C_{12}$ aryl optionally substituted with one or more R, or 5 to 12-membered heterocyclyl optionally substituted with one or more R.

4. The method according to claim 1, wherein the polyether is a polyether of formula (I)

(I)

wherein
n is an integer comprised between 1 and 500;
each occurrence of A is independently selected from:
   $C_3$-$C_{12}$ cycloalkyl optionally substituted with one or more groups R,
   $C_6$-$C_{12}$ aryl optionally substituted with one or more groups R,
   5 to 12-membered heterocyclyl optionally substituted with one or more groups R, and
   $C_1$-$C_{34}$ alkyl optionally substituted with one or more groups R and optionally intercalated with one or more groups Z;
each occurrence of R is independently selected from the group consisting of OH, linear or branched $C_1$-$C_{12}$ alkyl optionally substituted and optionally intercalated with one or more Z, optionally substituted linear or branched $C_2$-$C_{12}$ alkenyl, optionally substituted linear or branched $C_2$-$C_{12}$ alkynyl, optionally substituted $C_6$-$C_{12}$ aryl, and optionally substituted 5 to 12-membered heterocyclyl;
each occurrence of Z is independently selected from O, S, NH, N($C_1$-$C_6$ alkyl), $C_3$-$C_{12}$ cycloalkyl optionally substituted with one or more R, $C_6$-$C_{12}$ aryl optionally substituted with one or more R, or 5 to 12-membered heterocyclyl optionally substituted with one or more R.

5. The method according to claim 3, wherein A is independently selected from $C_1$-$C_{34}$ alkyl optionally substituted with one or more R and optionally intercalated with one or more Z.

6. The method according to claim 3, wherein each occurrence of R is independently selected from the group consisting of OH and linear or branched $C_1$-$C_{12}$ alkyl optionally substituted and optionally intercalated with one or more Z.

7. The method according to claim 3, wherein each occurrence of R is independently selected from the group consisting of OH and linear or branched $C_1$-$C_6$ alkyl.

8. The method according to claim 3, wherein Z is independently selected from oxygen, $C_3$-$C_{12}$ cycloalkyl optionally substituted with one or more R, or $C_6$-$C_{12}$ aryl optionally substituted with one or more R.

9. The method according to claim 3, wherein Z is independently selected from oxygen, $C_3$-$C_{12}$ cycloalkyl, or $C_6$-$C_{12}$ aryl.

10. The method according to claim 1, wherein the polyether has a number average molecular weight comprised between 500 and 100000 g/mol, measured by means of size-exclusion chromatography.

11. The method according to claim 3, wherein n is an integer comprised between 5 and 500.

12. The method according to claim 1, wherein the molar proportion of the protic ionic salt with respect to the total amount of moles of the at least one alcohol is between 1 to 10%.

13. The method according to claim 1, wherein the Brønsted acid is selected from the group consisting of alkylsulfonic acids, perfluoroalkylsulfonic acids, p-toluenesulfonic acid, diphenylphosphoric acid, trifluoroacetic acid, acetic acid, bis(perfluoroalkylsulfonyl)imide derivatives, citric acid, and mixtures thereof.

14. The method according to claim 1, wherein the Brønsted base is selected from the group consisting of guanidines, amidines, triethylamine, quaternary amines, imidazoles, pyridines, pyrrolidines, piperidines, triazoles, morpholines, phosphines and phosphazenes.

15. The method according to claim 1, wherein the molar proportion between the Brønsted acid and the Brønsted base is 1:1 to 5:1.

16. The method according to claim 1, wherein step (b) comprises the stages of:
  b1) heating the mixture obtained in step (a) at a temperature comprised between 100° C. and 150° C. for at least 12 hours; and
  b2) heating the mixture obtained in step (b1) at a temperature comprised between 150° C. and 300° C. for at least 12 hours.

17. The method according to claim 1, comprising the additional step (c), performed after step (b), of cooling the reaction at a temperature less than 50° C.

18. The method according to claim 1, comprising the additional step (d), performed after step (b) or after cooling the reaction at a temperature less than 50° C., of dissolving the polyether in a non-polar solvent, adding a polar solvent to precipitate and filter the polyether.

19. The method according to claim 1, wherein the polyether is a copolyether.

\* \* \* \* \*